US007953817B2

(12) United States Patent
Fan et al.

(10) Patent No.: US 7,953,817 B2
(45) Date of Patent: *May 31, 2011

(54) SYSTEM AND METHOD FOR SUPPORTING TCP OUT-OF-ORDER RECEIVE DATA USING GENERIC BUFFER

(75) Inventors: Kan Frankie Fan, Diamond Bar, CA (US); Scott McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 12/615,932

(22) Filed: Nov. 10, 2009

(65) Prior Publication Data
US 2010/0121995 A1   May 13, 2010

Related U.S. Application Data

(63) Continuation of application No. 11/013,494, filed on Dec. 15, 2004, now Pat. No. 7,617,291.

(60) Provisional application No. 60/531,166, filed on Dec. 19, 2003, provisional application No. 60/630,720, filed on Nov. 22, 2004.

(51) Int. Cl.
*G06F 15/167* (2006.01)
(52) U.S. Cl. ............................ 709/213; 709/214; 710/56
(58) Field of Classification Search ........................ None
See application file for complete search history.

(56) References Cited

U.S. PATENT DOCUMENTS

| 5,179,556 | A | * | 1/1993 | Turner .......................... 370/233 |
| 5,543,824 | A | * | 8/1996 | Priem et al. .................... 345/539 |
| 5,696,764 | A | * | 12/1997 | Soumiya et al. ......... 370/395.41 |
| 6,061,358 | A | * | 5/2000 | Nelson et al. ................. 370/412 |
| 6,363,075 | B1 | * | 3/2002 | Huang et al. .................. 370/412 |
| 6,657,964 | B1 | * | 12/2003 | Kohzuki et al. ............ 370/236.1 |
| 2003/0074449 | A1 | * | 4/2003 | Smith et al. .................... 709/226 |
| 2003/0123390 | A1 | * | 7/2003 | Takase et al. ............... 370/230.1 |
| 2004/0037319 | A1 | * | 2/2004 | Pandya .......................... 370/469 |

* cited by examiner

*Primary Examiner* — Seema S Rao
*Assistant Examiner* — Leon Andrews
(74) *Attorney, Agent, or Firm* — McAndrews, Held & Malloy, Ltd.

(57) ABSTRACT

A method and system for handling received out-of-order network data using generic buffers for non-posting TCP applications is disclosed. When incoming out-of-order data is received and there is no application buffer posted, a TCP data placement may notify a TCP reassembler to terminate a current generic buffer, allocate a new current generic buffer, and DMA the incoming data into the new current generic buffer. The TCP data placement may notify the TCP reassembler the starting TCP sequence number and the length of the new current generic buffer. Moreover, the TCP data placement may add entries into a TCP out-of-order table when the incoming data creates a new disjoint area. The TCP data placement may adjust an existing disjoint area to reflect any updates. When a TCP application allocates or posts a buffer, then the TCP reassembler may copy data from a linked list of generic buffers into posted buffers.

45 Claims, 16 Drawing Sheets

SYSTEM AND METHOD FOR SUPPORTING TCP OUT-OF-ORDER RECEIVE DATA USING GENERIC BUFFER

CROSS-REFERENCE TO RELATED APPLICATIONS/INCORPORATION BY REFERENCE

This application is a continuation of U.S. patent application Ser. No. 11/013,494, filed Dec. 15, 2004, which makes reference to, claims priority to, and claims the benefit U.S. Provisional Application Ser. No. 60/531,166, filed Dec. 19, 2003; and U.S. Provisional Application Ser. No. 60/630,720, filed Nov. 22, 2004.

FIELD OF THE INVENTION

Certain embodiments of the invention relate to the control of networking bandwidth. More specifically, certain embodiments of the invention relate to a method and system for handling received out-of-order network data using generic buffers for non-posting TCP applications.

BACKGROUND OF THE INVENTION

High-speed digital communication networks over copper, optical fiber and other hybrid media are used in many digital communication systems and storage applications. As these networks continue to evolve in order to meet ever-increasing bandwidth requirements, new protocols are being developed to more efficiently transfer information throughout these networks. For example, the well-known IEEE P802.3ae Draft 5 specifications describe requirements for 10 Gigabit Ethernet (GbE) applications, which may be used in communication networks and also in storage area networks (SANs).

Notwithstanding, the processing power and memory bandwidth of networking devices used in applications such 10 GbE have generally lagged behind the increased demand for networking bandwidth and faster data rates. In networks such as the Internet, which utilize transmission control protocol/internet protocol (TCP/IP), data copying and data transferring operations utilize a great deal of CPU and memory resources. In addition to diminished processing capacity, copying and transferring operations may also increase latency and delays in data processing, which may significantly effect time critical applications such as voice applications. A major consequence is that network computing nodes have become bottlenecks, which may significantly diminish system performance and network throughput.

Some TCP/IP networks typically employ a TCP offload engine (TOE) to facilitate more efficient packet processing. A TOE is an intelligent network adapter or network interface card (NIC) that may be configured to offload most or all of the TCP/IP protocol processing from the processor or CPU of a host system to the network adapter. One of the primary challenges associated with building a TCP offload engine involves the handling of non-posting TCP applications running on a host. Non-posting TCP applications are those that do not post or allocate buffers before the network adapter will receive data for the application. Current TOE designs store all their received data locally on the adapter in buffers known as TCP segment buffers. When a TCP application buffer is finally posted on the host system, the network adapter copies the data from the TCP segment buffers to the posted TCP application buffers and subsequently releases the TCP segment buffers for re-use by the TOE.

Conventional offload NICs may store, in TCP segment buffers, incoming data that is received in-order or out-of-order (OOO) from the manner in which it was transmitted at the other end of the network. Data may be received out-of-order for a variety of reasons, for example, when a packet is retransmitted after a request for retransmission occurs, which may occur after some of the later packets in the original transmission have been received properly. Packets may also be re-ordered due to routing changes within the network. However, storing the out-of-order data in TCP segment buffers can be quite hardware intensive. The quantity of out-of-order data, and therefore the size of TCP segment buffers needed, may scale with, for example, the bandwidth of the network connections, the delay on the connections, the number of connections and the type of connections. As network connections grow larger and faster, the quantity of out-of-order data that may require storage may be significantly larger than what the NIC may be capable to store. Large numbers of incoming out-of-order data may also prevent or otherwise hinder the immediate processing of TCP control data performed by the NIC because of the added processing involved in managing and storing large quantities of data. Large numbers of incoming out-of-order data, after sitting in the TOE storage, may be complete when missing data arrives. Now the TCP segment buffer bandwidth and host memory bandwidth must be doubled to allow the delayed data to be written to the host along with any new in-coming data. In some instances, a TOE implementer or designer may be faced with the undesirable option of dropping out-of-order data if there is insufficient storage space on the NIC or even dropping in-order data due to lack of host or re-assembly buffer bandwidth. When out-of-order data is dropped or otherwise discarded, the sending side may have to re-transmit all the dropped data. Since dropped data is interpreted as congestion by the TCP sending station, this approach may result in about a fifty percent (50%) decrease in throughput or network bandwidth utilization in some instances, effectively eliminating any of the benefits of offloading TCP applications to a network adapter in the first place.

Some network adapters may use generic buffers on the non-posting host for handling TCP data that has been received in-order until posted buffers may become available. This approach may provide some relief to the TOE in terms of hardware requirements. In such instances, the TOE simply sends the in-order data to the generic buffers on the host system as received. However, this approach does not address the scaling concerns that may be faced by network adapters for handling the storage and management of incoming out-of-order data when network connections become larger and faster. The issue remains that received out-of-order data may be too large to store in the network adapter. In the case that network adapters may utilize also generic buffers in the non-posting host for received out-of-order data, the non-posting host may have to maintain open and keep track of what may be a large number of generic buffers containing out-of-order data until all the necessary data has arrived and/or until a posted buffer is made available. In this regard, the non-posting host may, in some instances, not be able to copy portions of data stored in the generic buffers even when a posted buffer is made available. This result may arise since the non-posting host tracks all the received data, in-order and out-of-order, by means of the relative information in the generic buffers. Closing any of the generic buffers, even when the contents may be transferred to a posted buffer, may make tracking of all the out-of-order data much more difficult to perform. When multiple connections exists and the number of generic buffers increases significantly, the non-posting host may be limited in its ability to handle out-of-order data. Moreover, the non-posting host may not make efficient use of the memory resources available and system performance and network throughput may be significantly affected.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a method and system for handling received out-of-order network data using generic buffers for non-posting TCP applications. Aspects of the method for controlling network bandwidth may comprise assigning a plurality of generic buffers in a host system to store received data when the host system has not posted an application buffer. The received data may be in-order data or out-of-order data. The assigned generic buffers may be tracked and may be link listed based on the transmission sequence of the received data. The received data in the linked list of assigned generic buffers may be transferred to at least one application buffer when the application buffer is posted by the host system. At least a portion of the received data may be transferred to the generic buffers via direct memory access (DMA). A sequence number and a length of disjoint portions of a data sequence space associated with at least a portion of the received data may be tracked. An extent of the posted application buffer may also be tracked. A current generic buffer may be assigned to store at least a portion of the received data. A sequence number and a length of the current generic buffer may also be tracked.

In another aspect of the method, the processing of the received data may be separated into out-of-order tracking and posted application buffer processing in a remote system and processing of out-of-order segments sorting and buffer completion processing in the host system. The remote system may be, for example, a network interface card (NIC). Link listing the generic buffers may be performed when a new generic buffer is needed to store at least a portion of the received data. A new generic buffer may be started when the received data is discontinuous or the received data exceeds the size of a current generic buffer. Moreover, link listing the generic buffers may occur when at least a portion of the received data in the generic buffers is transferred to at least one posted application buffer.

In another aspect of the method, information associated with out-of-order tracking and with status of a single generic buffer may be stored in a first memory. This first memory may be located in the NIC, for example. Information associated with a list of generic buffers for in-order data or with the posted application buffer may be stored in a second memory. This second memory may be located in the host system, for example.

Another aspect of the invention may be found in a machine-readable storage (e.g., any non-transitory machine-readable storage on which a computer program may be stored, for example, a CD, a DVD, an optical disk, a memory device, etc.) having stored thereon, a computer program having at least one code section for packet transmission, the at least one code section being executable by a machine for causing the machine to perform steps as described above for handling received out-of-order network data using generic buffers for non-posting TCP applications.

Certain aspects of the system for controlling network bandwidth may comprise circuitry that assigns a plurality of generic buffers in a host system to store received data when the host system has not posted an application buffer. The received data may be in-order data or out-of-order data. Circuitry may be provided that tracks the assigned generic buffers. Circuitry may also be provided that link lists the generic buffers based on the transmission sequence of the received data. Circuitry may be provided that transfers the received data in the linked list of assigned generic buffers to at least one application buffer when the application buffer is posted by the host system. Circuitry may be provided that transfers at least a portion of the received data to the generic buffers via direct memory access (DMA). Circuitry may be provided that tracks a sequence number and a length of disjoint portions of a data sequence space associated with at least a portion of the received data. Circuitry may also be provided that tracks an extent of the posted application buffer. Circuitry may also be provided that assigns a current generic buffer to store at least a portion of the received data.

These and other advantages, aspects and novel features of the present invention, as well as details of an illustrated embodiment thereof, will be more fully understood from the following description and drawings.

DETAILED DESCRIPTION OF THE INVENTION

Aspects of the present invention may be found in a method and system for handling received out-of-order network data using generic buffers for non-posting TCP applications. Aspects of the method for controlling network bandwidth may comprise determining whether a TCP application buffer is allocated or posted by a host when an incoming out-of-order data is received. If no TCP application buffer is posted, a NIC may allocate a new generic buffer, place the data into the generic buffer, and generate instructions to the host to record the generic buffer where the incoming out-of-order data was stored. Transfer of the incoming out-of-order data to the allocated new generic buffers may occur via direct memory access (DMA) transfer. At least one new generic buffer may be allocated in memory external to the NIC.

Figure 1:
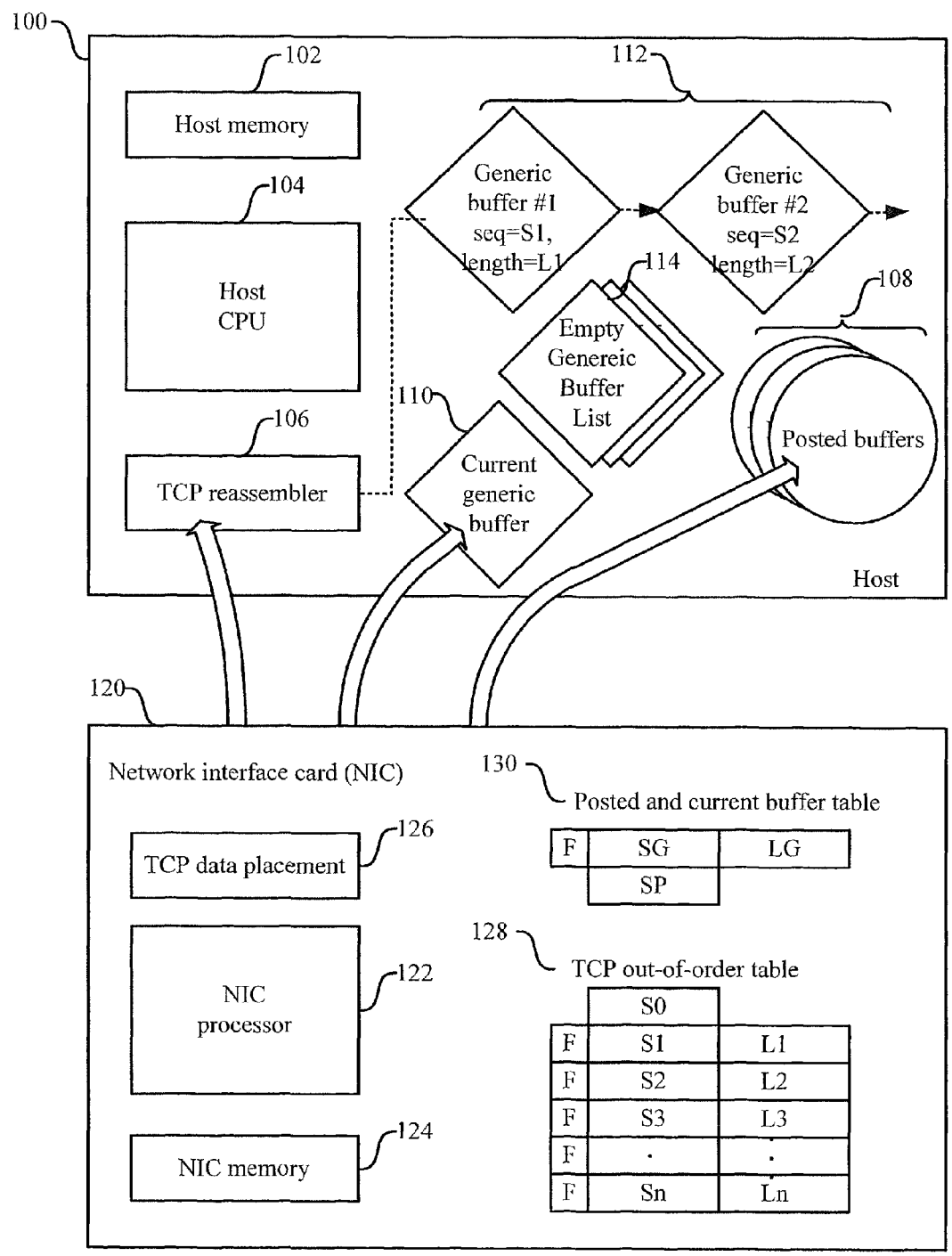
FIG. 1 is a bock diagram of a system that may be utilized for handling received out-of-order network data using generic buffers for non-posting TCP applications.

FIG. 1 is a bock diagram of a system that may be utilized for handling received out-of-order network data using generic buffers for non-posting TCP applications. Referring to FIG. 1, there are shown a host 100 and a network interface card (NIC) 120. The host 100 may comprise a host central processing unit (CPU) 104, a host memory 102, a TCP reassembler application 106, at least one posted buffer 108, at least one empty generic buffer in an empty generic buffer list 114, and a current generic buffer 110. When at least one current generic buffer 110 has been used, the host 110 may also comprise a linked list of generic buffers 112. The NIC 120 may comprise a NIC processor 122, a NIC memory 124, a TCP data placement application 126, a TCP out-of-order table 128, and a posted and current buffer table 130.

The host memory 102 may comprise suitable logic, circuitry, and/or code that may be adapted to store information that may be utilized by the host 100. The host memory 102 may be adapted to store data related to TCP applications and/or to store data related to any system application. The host CPU 104 may comprise suitable logic, circuitry, and/or code that may be adapted to perform network processing operations. The CPU 104 may be adapted to execute all related TCP applications that have not been offloaded to the NIC 120, any instructions sent from the NIC 120, and also any system application necessary to perform network processing operations. The TCP reassembler 106 may comprise suitable logic, circuitry, and/or code that may be adapted to, allocate and maintain the list of free generic buffers, execute instructions from the NIC 120 for selecting and completing the current generic buffer 110, for assembling the linked list generic buffers 112, for transferring data from the linked list of generic buffers 112 to posted buffers 108, and for returning the now empty generic buffers back to the free generic buffer list. The TCP reassembler 106 may be implemented to operate with a NIC 120 driver that may be executed in the host 100.

A generic buffer, used as 110, 112, and 114 may be, for example, a data structure that may be utilized to store information related to an out-of-order or in-order portion of the TCP transmission sequence destined for an application that has not pre-posted buffers. A generic buffer may be allocated or posted and may also be completed by instructions from the NIC 120. Generic buffers can be maintained in a list and may also hold descriptive information about their data such as the TCP sequence number of the first byte and the number of bytes currently in the generic buffer. Idle generic buffers that are not currently in use are located in the list of free generic buffers 114. Out-of-order or in-order TCP data may be transferred from the NIC 120 to the generic buffer which the NIC 120 is treating as the current generic buffer 110. The linked list of generic buffers 112 may comprise a plurality of generic buffers 110 that have been filled and that may be grouped or linked based on the order of transmission as defined by the TCP sequence number. The posted buffers 108 may be, for example, data structures that may be utilized by the host 100 or NIC 120 to store information related to in-order and out-of order portions of the TCP transmission sequence. The posted buffers 108 may be allocated or posted by application on the host 100. The posted buffers are completed and returned to the application by the TCP assembler 106 based on instructions from the NIC 120.

The NIC processor 122 may comprise suitable logic, circuitry, and/or code that may be adapted to execute all offloaded TCP applications and/or any system application necessary for operation of the NIC 120. The NIC memory 128 may comprise suitable logic, circuitry, and/or code that may be adapted to store data related to TCP applications and may also store data related to any system application necessary for operation of the NIC 120. The TCP data placement application 126 may comprise suitable logic, circuitry, and/or code that may be adapted to handle in-order and out-of-order TCP received data. The TCP data placement application 126 may be utilized to communicate, notify, and/or transfer to the host 100 instructions generated by the NIC 120 and/or TCP data received by the NIC 120. Communications between the NIC 120 and the host 100 may be performed via a system interconnect such as PCI, for example. The TCP out-of-order table 128 may comprise multiple data structures that may be utilized to keep track of out-of-order data by storing entries with information on disjoint received data. In this embodiment, the disjoint information is stored as the TCP sequence number of the end of the in-order data (S0), with the starting TCP sequence number (Sn) and length in bytes (Ln) of each area of received data. The posted and current buffer table 130 may comprise multiple data structures that may be utilized to keep track of the location and identity of the current generic buffer 110 as well as the TCP sequence number of the first byte (SG) and the number of bytes (LG) in the current generic buffer. Also in the posted and current buffer table 130 is the TCP sequence number of the last byte position (SP) in posted buffers 108 on the host 100. FIGS. 2A-2M describe an illustrative example of the operation and functionality provided by the NIC 120 and the host 100 for handling received out-of-order network data using generic buffers for non-posting TCP applications.

Figure 2A:
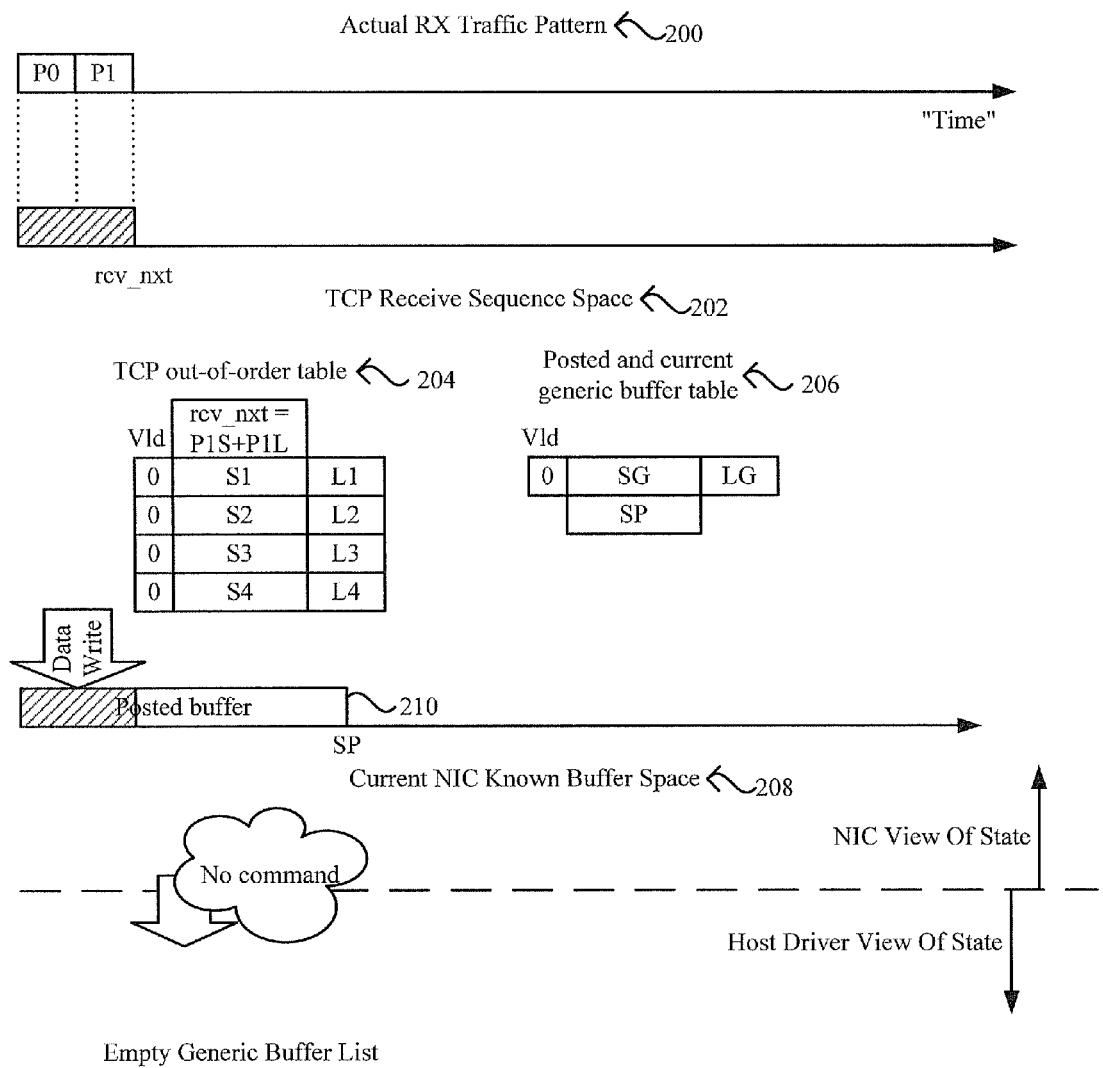
FIG. 2A is a diagram illustrating exemplary steps that may be utilized for handling out-of-order data when a packet P0 and a packet P1 arrive in order with respect to the order of transmission, in accordance with an embodiment of the invention.

FIG. 2A is a diagram illustrating exemplary steps that may be utilized for handling out-of-order data when a packet P0 and a packet P1 arrive in order with respect to the order of transmission, in accordance with an embodiment of the invention. Referring to FIG. 2A, the actual receive (RX) traffic pattern 200 illustrates an exemplary arrival in time of TCP packets P0 and P1 to the NIC 120 in FIG. 1. The packets P0 and P1 may correspond to, for example, a first packet and a second packet, respectively, in a TCP transmission sequence. In this case, the packets P0 and P1 are received by the NIC 120 in the appropriate transmission order and without any gap or time intervals between the end of packet P0 and the beginning of packet P1. The TCP receive sequence space 202 may correspond to a representation of the portion of the TCP transmission sequence that has been received by the NIC 120. The in-order mark point (rcv_nxt) shown in the TCP receive sequence space 202 may correspond to an indication of received in-order packets in TCP space. Since both packets P0 and P1 have arrived in-order, the rcv_nxt location points to the end of packet P1 to indicate that the NIC 120 has received all the information transmitted prior to the end of packet P1.

A TCP out-of-order table 204 and a posted and current generic buffer table 206 are shown in FIG. 2A. The TCP out-of-order table 204 and the posted and current generic buffer table 206 correspond, respectively, to exemplary implementations of the TCP out-of-order table 128 and the posted current generic buffer table 130 in FIG. 1. In the example described in FIG. 2A, the TCP out-of-order table 204 may comprise an entry for rcv_nxt and four entries that correspond to the sequence (S) and length (L) of disjoint portions of the received TCP sequence. In this regard, the length L may correspond to the length of a contiguous area of TCP sequence space. This table describes received data, and is used regardless of weather application posted buffers are available or not. In addition, each of the entries may have a valid flag (Vld) that may be either logic 0 or logic 1. Logic 0 may be utilized to indicate that an entry in the TCP out-of-order table 204 does not contain information regarding a disjoint portion of the TCP sequence. Logic 1 may be utilized to indicate that an entry in the TCP out-of-order table 204 contains information regarding a disjoint portion of the TCP sequence. The posted and current generic buffer table 206 may comprise an entry for the sequence (SG) and length (LG) of the current generic buffer 110 in FIG. 1 and an entry for the sequence end (SP) of the posted buffers 108. In this regard, the length LG may correspond to the length of information that are currently stored in the current generic buffer. The overall length of the current generic buffer may be larger than LG. In addition, the entry for the current generic buffer 110 may have a valid flag (Vld) that may be either logic 1 or logic 0. Logic 0 may correspond to the case when a current generic buffer 110 is not valid. This corresponds to when generic buffers are not in use. Logic 1 may correspond to the case when a current generic buffer is valid. This corresponds to when generic buffers are in use.

In the case described in FIG. 2A, the rcv_nxt entry in the TCP out-of-order table 204 may be given as rcv_nxt=P1S+P1L, where P1S is the sequence number of the packet P1 and P1L is the length of the packet P1. The NIC 120 may transfer the packets P0 and P1 to a first posted buffer 210 in the posted buffers 108 since there is sufficient space in the first posted buffer 210. The packets P0 and P1 may be transferred to the first posted buffer 210 via direct memory access (DMA) transfer, for example. A current generic buffer 110 may not be needed in this case since the first posted buffer 210 is available. Since no disjoint TCP space portions are created by the arrival of the packets P0 and P1, no entries may be necessary in the TCP out-of-order table 204 and/or in the posted and current generic buffer table 206. In this regard, the valid flags for entries in the TCP out-of-order table 204 and/or in the posted and current generic buffer table 206 may indicate a value of logic 0.

The current NIC known buffer space 208 may correspond to information that the NIC 120 may have as to current data and/or packet storage space available in the posted buffers 108 and the location where data may be placed in the posted buffers 108. In this regard, the NIC 120 may utilize information contained in the posted and current generic buffer table 206.

Figure 2B:
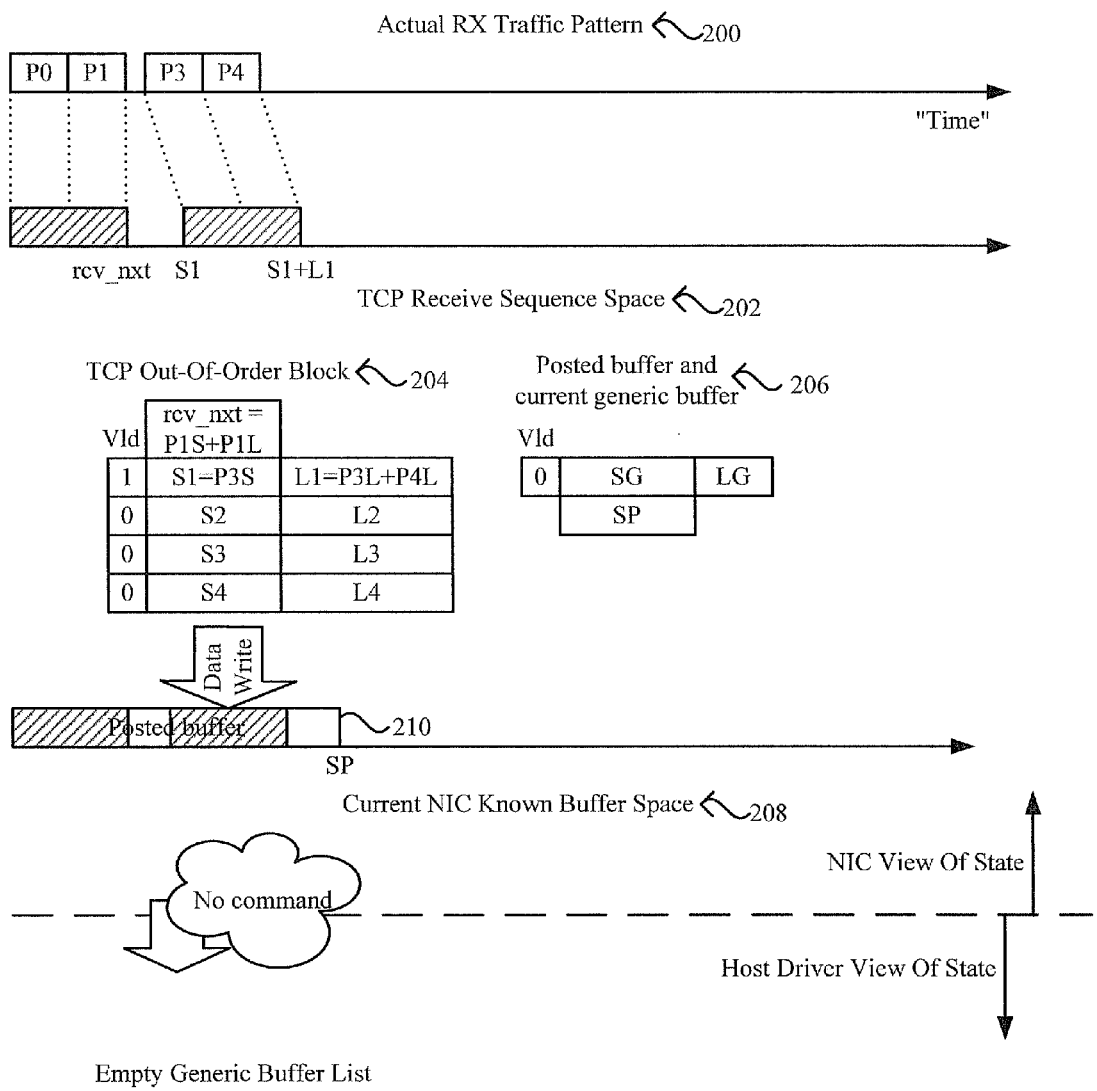
FIG. 2B is a diagram illustrating exemplary steps that may be utilized for handling out-of-order data when a packet P3 and a packet P4 arrive out-of-order with respect to the order of transmission, in accordance with an embodiment of the invention.

FIG. 2B is a diagram illustrating exemplary steps that may be utilized for handling out-of-order data when a packet P3 and a packet P4 arrive out-of-order with respect to the order of transmission, in accordance with an embodiment of the invention, but fall within a posted buffer. Regarding FIG. 2B, the packets P3 and P4 may arrive in-order with respect to each other at the NIC 120 but before the arrival of a packet P2, as shown in the actual receive RX traffic pattern 200. The packets P3 and P4 may correspond to a fourth packet and a fifth packet, respectively, in a TCP transmission sequence. In this case, there is a gap or time interval between the end of the packet P1 and the beginning of the packet P3 in the actual receive RX traffic pattern 200. A first disjoint portion in the TCP transmission sequence may result from the arrival of the packets P3 and P4 as shown in the TCP receive sequence space 202. The first disjoint portion in the TCP transmission sequence may be indicated in the TCP out-of-order table 204 with a first entry S1=P3S and L1=P3L+P4L, where P3S is the sequence number of the packet P3, P3L is the length of the packet P3, and P4L is the length of the packet P4. The valid flag for the first entry may be assigned a value of logic 1 to indicate that a valid entry exists in the TCP out-of-order table 204 for a first disjoint portion in the TCP receive sequence space 202.

Since the first posted buffer 210 may have sufficient storage space to the right of the packets P0 and P1 to store the packets P3 and P4, the NIC 120 may transfer the packets P3 and P4 to the first posted buffer 210. In this regard, the packets P3 and P4 may be placed in the first posted buffer 210 in a location that corresponds to their respective position in the transmission order. A current generic buffer 110 may not be needed in this case since the first posted buffer 210 may accommodate the packets P3 and P4. The rcv_nxt entry in the TCP out-of-order table 204 may remain unchanged since the packet P2 has not yet been received by the NIC 120.

Figure 2C:
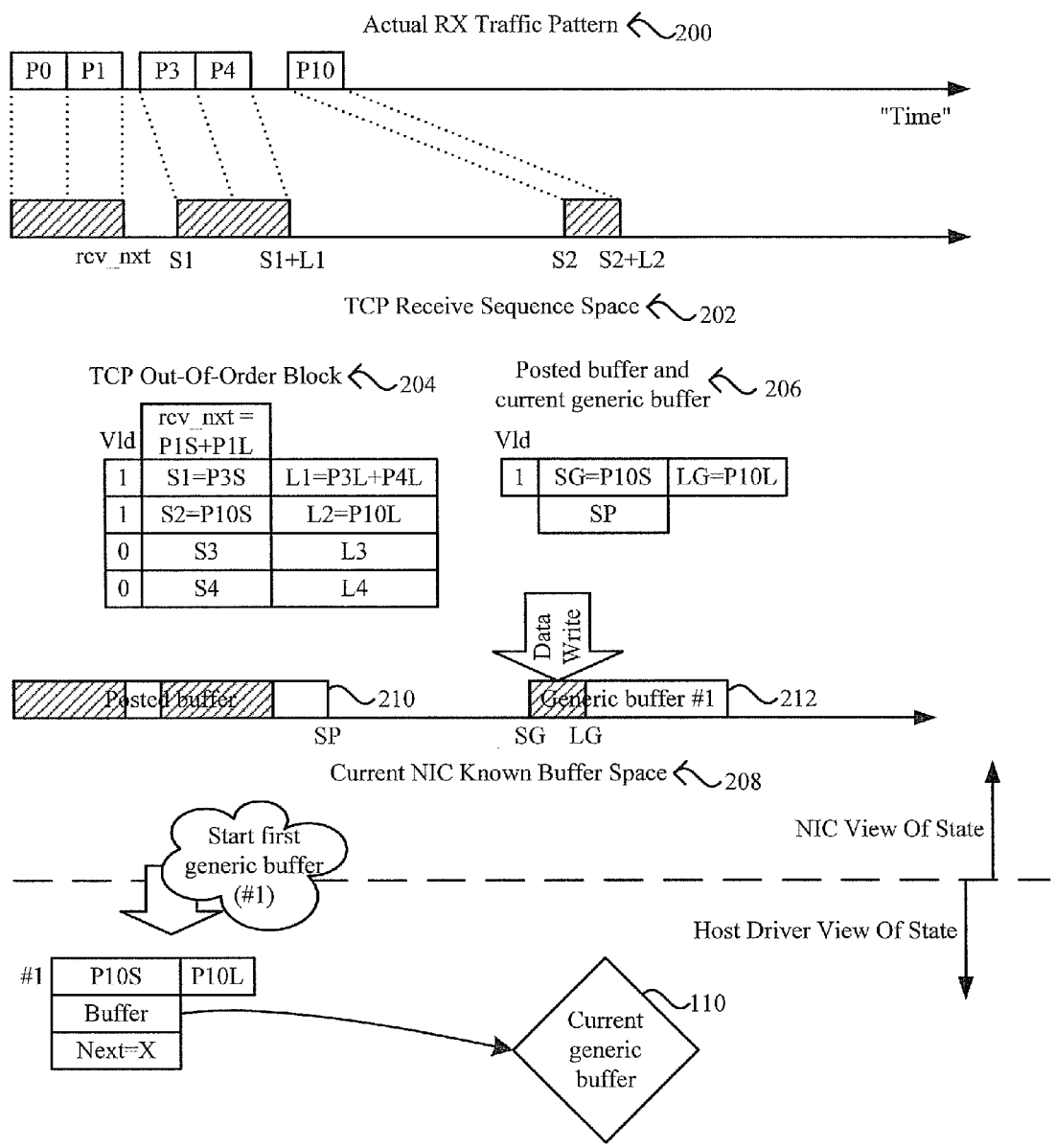
FIG. 2C is a diagram illustrating exemplary steps that may be utilized for handling out-of-order data when a packet P10 arrives out-if-order with respect to the order of transmission, in accordance with an embodiment of the invention.

FIG. 2C is a diagram illustrating exemplary steps that may be utilized for handling out-of-order data when a packet P10 arrives out-if-order with respect to the order of transmission, in accordance with an embodiment of the invention. Referring to FIG. 2C, the packet P10 may arrive at the NIC 120 before the arrival of packets P2, P5, P6, P7, P8, and P9, as shown in the actual receive RX traffic pattern 200. The packet P10 may correspond to an eleventh packet in the TCP transmission sequence. In this case, there is a gap or time interval between the end of the packet P4 and the beginning of the packet P10 in the actual receive RX traffic pattern 200. A second disjoint portion in the TCP transmission sequence may result from the arrival of the packet P10 as shown in the TCP receive sequence space 202. The second disjoint portion in the TCP transmission sequence may be indicated in the TCP out-of-order table 204 with a second entry S2=P10S and L2=P10L, where P108 is the sequence number of the packet P10 and P10L is the length of the packet P10. The valid flag for the second entry may be assigned a value of logic 1 to indicate that a valid entry exists in the TCP out-of-order table 204 for a second disjoint portion in the TCP receive sequence space 202.

Since the first posted buffer 210 may not have sufficient storage space to store the packet P10, the NIC 120 may indicate to a driver in the host 100 that a first generic buffer 212 has been allocated from the pool of free generic buffer 114 and it has been used to store the information in the packet P10. For this purpose, a current generic buffer 110 may be posted and utilized as the first generic buffer 212 in the linked list of generic buffers 112. In this regard, the current generic buffer entry in the posted and current generic buffer table 206 may be updated to show SG=P10S and LG=P10L. The valid flag for the current generic buffer entry may be assigned a value of logic 1 to indicate that a valid entry exists in the posted and current generic buffer table 206. The data in the packet P10 may then be transferred to the current generic buffer 110. The rcv_nxt entry in the TCP out-of-order table 204 may remain unchanged since the packet P2 has not yet been received by the NIC 120.

Figure 2D:
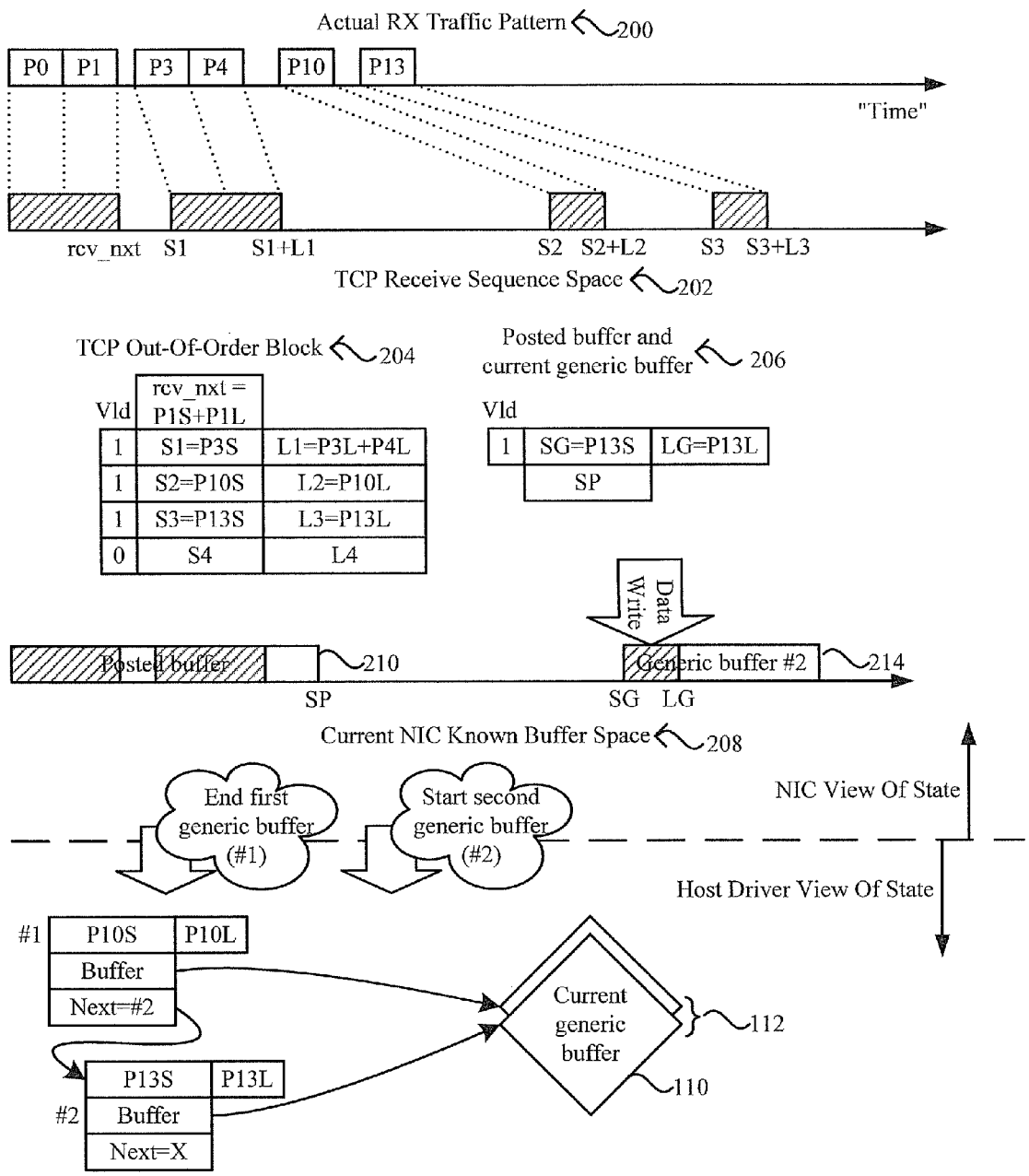
FIG. 2D is a diagram illustrating exemplary steps that may be utilized for handling out-of-order data when a packet P13 arrives out-of-order with respect to the order of transmission, in accordance with an embodiment of the invention.

FIG. 2D is a diagram illustrating exemplary steps that may be utilized for handling out-of-order data when a packet P13 arrives out-of-order with respect to the order of transmission, in accordance with an embodiment of the invention. Referring to FIG. 2D, the packet P13 may arrive at the NIC 120 before the arrival of the packets P2, P5, P6, P7, P8, P9, P11, and P12, as shown in the actual receive RX traffic pattern 200. The packet P13 may correspond to a fourteenth packet in the TCP transmission sequence. In this case, there is a gap or time interval between the end of the packet P10 and the beginning of the packet P13 in the actual receive RX traffic pattern 200. A third disjoint portion in the TCP transmission sequence may result from the arrival of the packet 13 as shown in the TCP receive sequence space 202. The third disjoint portion in the TCP transmission sequence may be indicated in the TCP out-of-order table 204 with a third entry S3=P13S and L3=P13L, where P13S is the sequence number of the packet P13 and P13L is the length of the packet P13. The valid flag for the third entry may be assigned a value of logic 1 to indicate that a valid entry exists in the TCP out-of-order table 204 for a third disjoint portion in the TCP receive sequence space 202.

Since neither the first posted buffer 210 does not have space to store packet P13 and packet P13 is not in-order with respect to the current generic buffer 110, the NIC 120 may indicate to a driver in the host 100 that the current generic buffer 110, which in this case corresponds to the first generic buffer 212, may need to be completed and a second generic buffer 214 has been allocated from the pool of free generic buffers 114 and has been used to store the information from the packet P13. As a result, the current generic buffer 110 may be completed and placed in the linked list of generic buffers 112 as the first generic buffer 212 and a new current generic buffer 110 may be posted that corresponds to the second generic buffer 214. In this regard, the current generic buffer entry in the posted and current generic buffer table 206 may be updated to show SG=P13S and LG=P13L. The data in the packet P13 may be transferred to the current generic buffer 110. The rcv_nxt entry in the TCP out-of-order table 204 may remain unchanged since the packet P2 has not yet been received by the NIC 120.

Figure 2E:
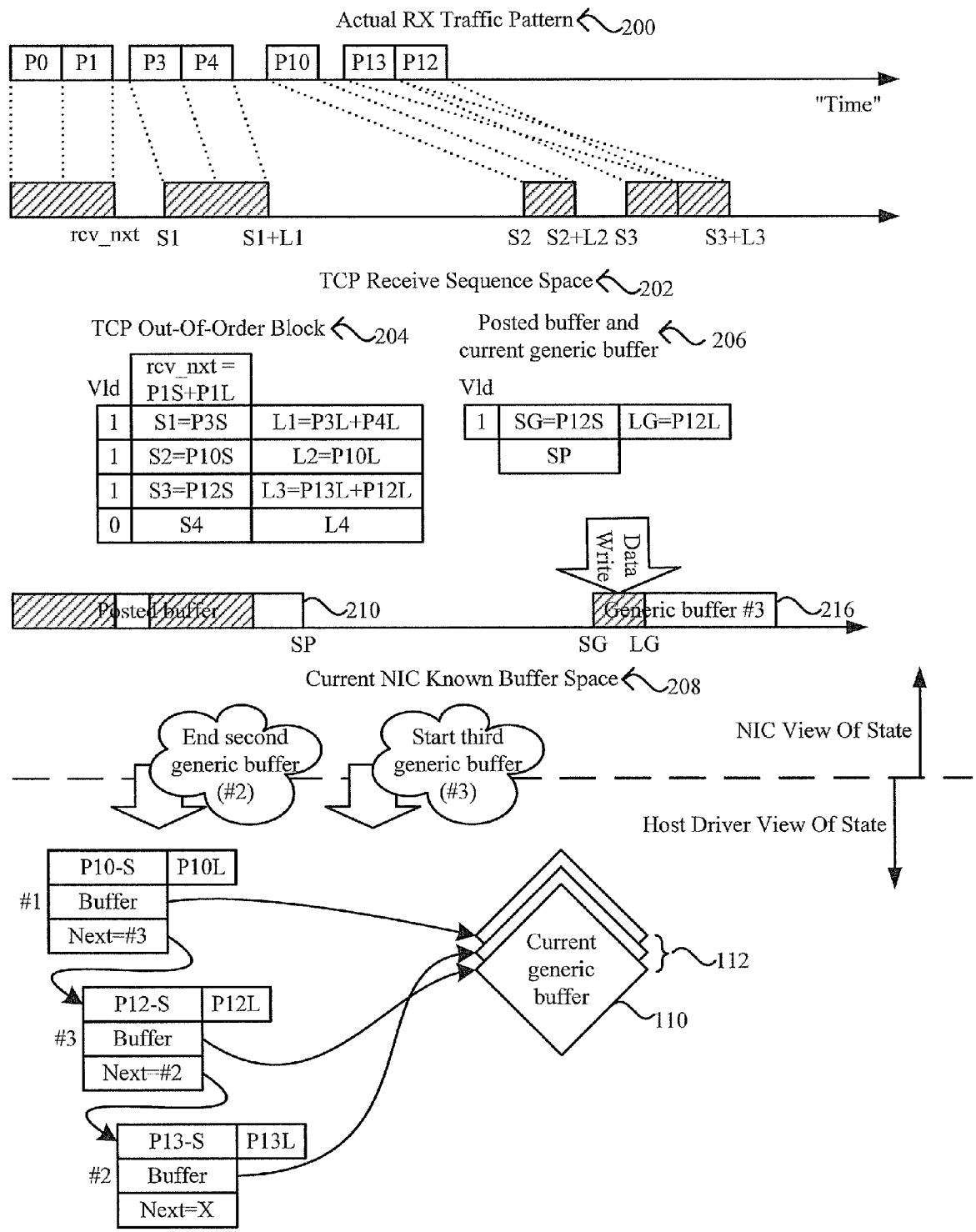
FIG. 2E is a diagram illustrating exemplary steps that may be utilized for handling out-of-order data when a packet P12 arrives out-of-order with respect to the order of transmission, in accordance with an embodiment of the invention.

FIG. 2E is a diagram illustrating exemplary steps that may be utilized for handling out-of-order data when a packet P12 arrives out-of-order with respect to the order of transmission, in accordance with an embodiment of the invention. Referring to FIG. 2E, the packet P12 may arrive at the NIC 120 before the arrival of packets P2, P5, P6, P7, P8, P9, and P11, but right after the arrival of packet P13, as shown in the actual receive RX traffic pattern 200. The packet P12 may correspond to a thirteenth packet in the TCP transmission sequence. In this case, there is no gap or time interval between the end of the packet P13 and the beginning of the packet P12 in the actual receive RX traffic pattern 200. The packet P12 may be placed to the left of the packet P13 in the third disjoint portion in the TCP transmission sequence as shown in the TCP receive sequence space 202. Packet P13 extends the third disjoint portion in the TCP transmission sequence to the left and may be indicated in the TCP out-of-order table 204 with by updating the third entry to S3=P12S and L3=P13L+P12L, where P12S is the sequence number of the packet P12 and P12L is the length of the packet P12.

The current generic buffer 110, which in this case, corresponds to the second generic buffer 214, may not be able to store the packet P12 because P12 is not in-order with respect to the current generic buffer. Since neither the first posted buffer 210 nor the current generic buffer 110 may have sufficient storage space to store the packet P12, the NIC 120 may indicate to the driver in the host 100 that the second generic buffer 214 may need to be completed and that a third generic buffer 216 has been allocated from the poll of free generic buffers 114 and the information in the packet P12 has been placed in the new generic buffer. As a result, the current generic buffer 110 may be completed and placed in the linked list of generic buffers 112 as the second generic buffer 214 and a new current generic buffer 110 may be posted that corresponds to the third generic buffer 216. In this regard, the current generic buffer entry in the posted and current generic buffer table 206 may be updated to show SG=P12S and LG=P12L. The data in the packet P12 may be transferred to the current generic buffer 110. The linked list of generic buffers 112 may be updated to reflect the fact that the second generic buffer 214, containing information regarding the packet P13, may need to be placed after the current generic buffer 110, which corresponds to the third generic buffer 216. The rcv_nxt entry in the TCP out-of-order table 204 may remain unchanged since the packet P2 has not yet been received by the NIC 120. The link list in the host is being maintained in sorted order. It is also possible, without deviating from the invention to postpone sorting of this list until posted buffers are completed.

Figure 2F:
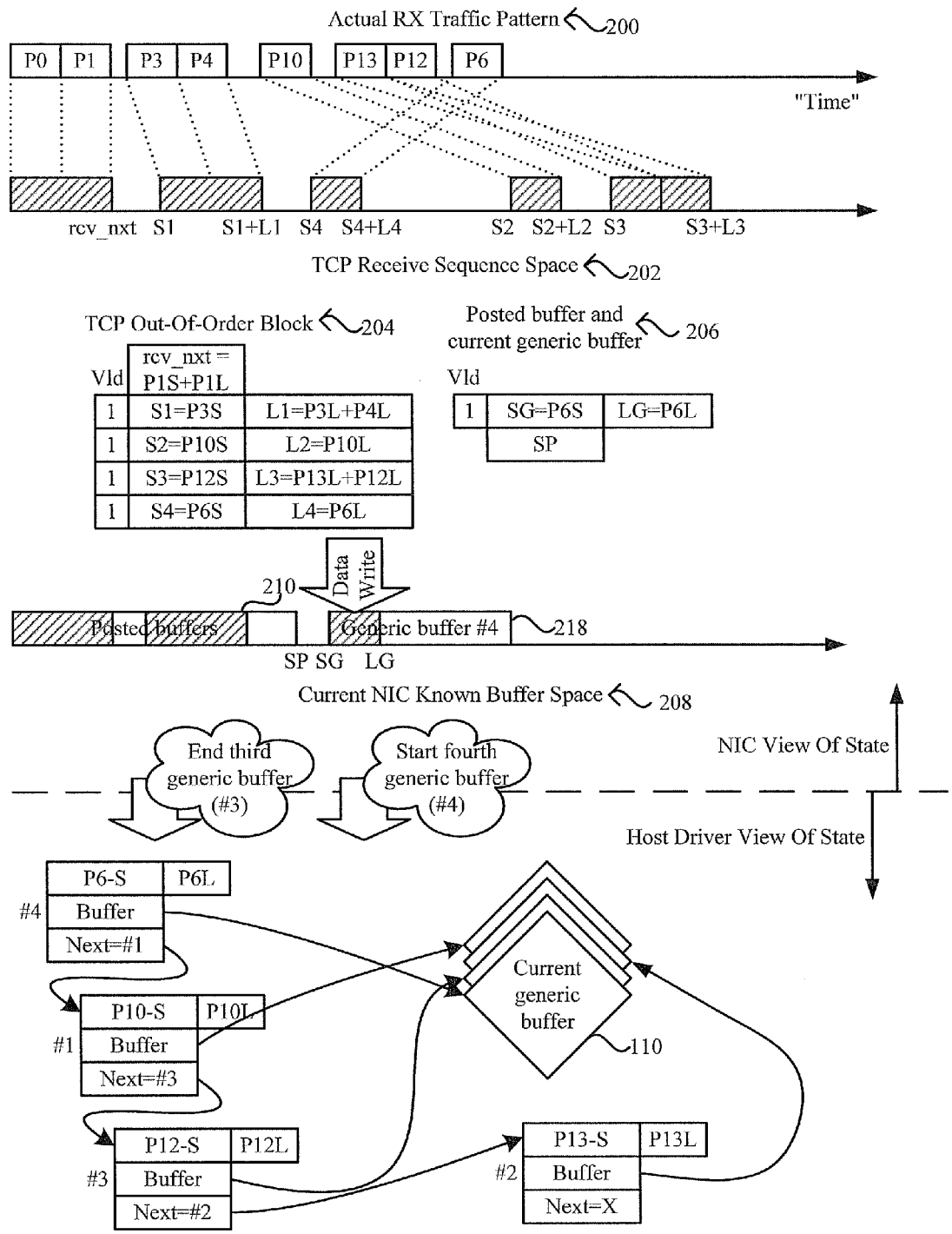
FIG. 2F is a diagram illustrating exemplary steps that may be utilized for handling out-of-order data when a packet P6 arrives out-of-order with respect to the order of transmission, in accordance with an embodiment of the invention.

FIG. 2F is a diagram illustrating exemplary steps that may be utilized for handling out-of-order data when a packet P6 arrives out-of-order with respect to the order of transmission, in accordance with an embodiment of the invention. Referring to FIG. 2F, the packet P6 may arrive at the NIC 120 before the arrival of the packets P2 and P5, as shown in the actual receive RX traffic pattern 200. The packet P6 may correspond to a seventh packet in the TCP transmission sequence. In this case, there is a gap or time interval between the end of the packet P12 and the beginning of the packet P6 in the actual receive RX traffic pattern 200. A fourth disjoint portion in the TCP transmission sequence may result from the arrival of the packet P6 as shown in the TCP receive sequence space 202. The fourth disjoint portion in the TCP transmission sequence may be indicated in the TCP out-of-order table 204 with a fourth entry S4=P6S and L4=P6L, where P6S is the sequence number of the packet P6 and P6L is the length of the packet P6. The valid flag for the fourth entry may be assigned a value of logic 1 to indicate that a valid entry exists in the TCP out-of-order table 204 for a fourth disjoint portion in the TCP receive sequence space 202.

The current generic buffer 110, which in this case, corresponds to the third generic buffer 216, may not be able to store the packet P6 because P6 is not in-order with respect to the current generic buffer. Since neither the first posted buffer 210 nor the current generic buffer 110 may have sufficient storage space to store the packet P6, the NIC 120 may indicate to a driver in the host 100 that the third generic buffer 216 may need to be completed and that the NIC has allocated the fourth generic buffer 218 from the free list of generic buffers and has stored the information from the packet P6 in the new generic buffer. In this regard, the current generic buffer 110 may be completed and placed in the linked list of generic buffers 112 as the third generic buffer 216 and a new current generic buffer 110 may be posted that corresponds to the fourth generic buffer 218. In this regard, the current generic buffer entry in the posted and current generic buffer table 206 may be updated to show SG=P6S and LG=P6L. The linked list of generic buffers 112 may be updated to reflect the fact that the first generic buffer 212 may need to be placed after the current generic buffer 110 that contains information regarding the packet P6. The data in the packet P6 may be transferred to the current generic buffer 110. The rcv_nxt entry in the TCP out-of-order table 204 may remain unchanged since the packet P2 has not yet been received by the NIC 120.

Figure 2G:
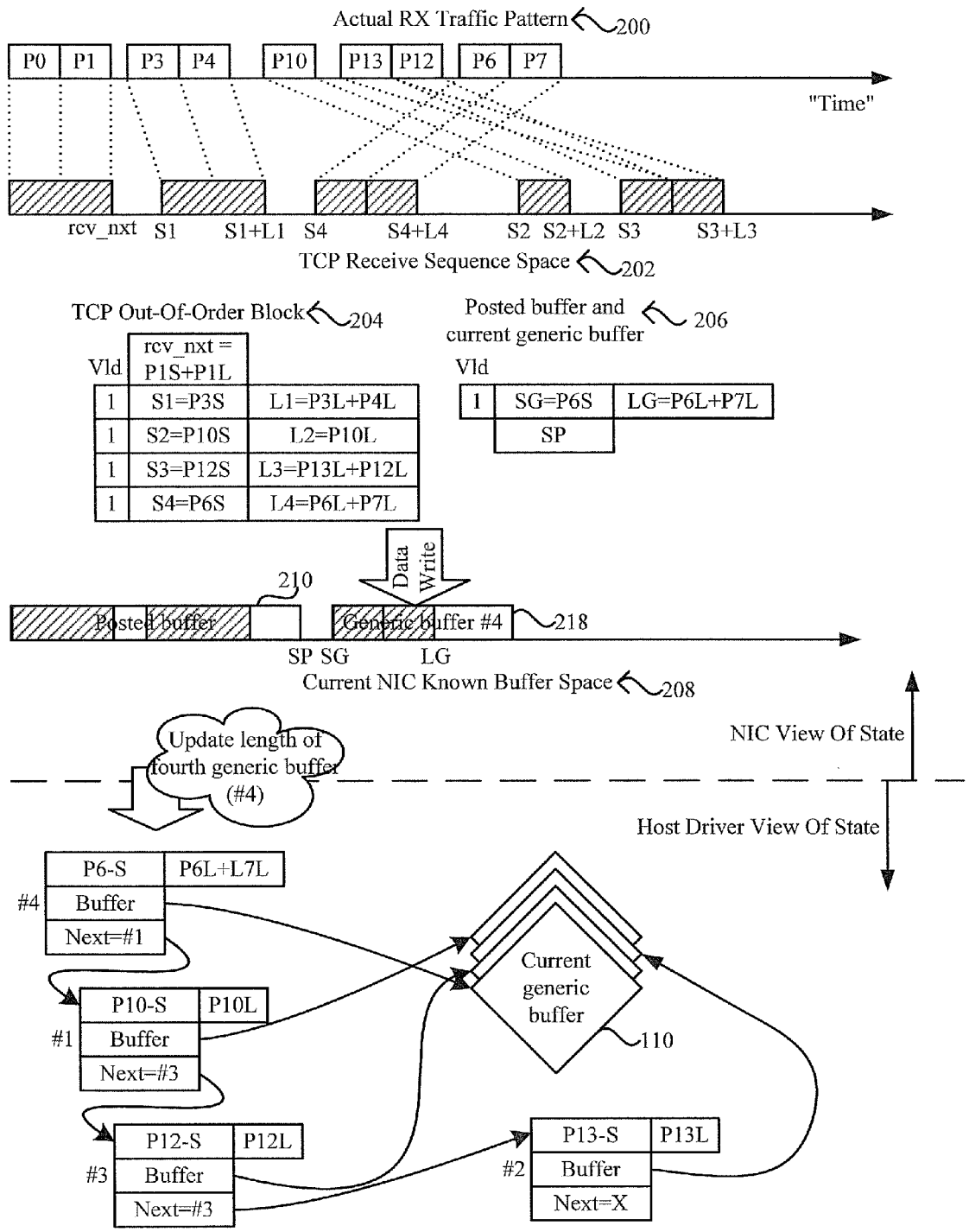
FIG. 2G is a diagram illustrating exemplary steps that may be utilized for handling out-of-order data when a packet P7 arrives out-of-order with respect to the order of transmission, in accordance with an embodiment of the invention.

FIG. 2G is a diagram illustrating exemplary steps that may be utilized for handling out-of-order data when a packet P7 arrives out-of-order with respect to the order of transmission, in accordance with an embodiment of the invention. Referring to FIG. 2G, the packet P7 may arrive at the NIC 120 before the arrival of the packets P2 and P5, but right after the arrival of packet P6, as shown in the actual receive RX traffic pattern 200. The packet P7 may correspond to an eighth packet in the TCP transmission sequence. In this case, there is no gap or time interval between the end of the packet P6 and the beginning of the packet P7 in the actual receive RX traffic pattern 200. The packet P7 may be placed to the right of the packet P6 in the fourth disjoint portion in the TCP transmission sequence as shown in the TCP receive sequence space 202. The fourth disjoint portion in the TCP transmission sequence may be indicated in the TCP out-of-order table 204 by modifying the fourth entry to extend that contiguous area to the right with S4=P6S and L4=P6L+P7L, where P7L is the length of the packet P7.

The current generic buffer 110, which in this case, corresponds to the fourth generic buffer 218, may store the packet P7 because the new packet is in-order with respect to the content in the current generic buffer. In this case, the NIC 120 may indicate to a driver in the host 100 that the length of the fourth generic buffer 218 may be extended to indicate the storage of the packet P7 in the fourth generic buffer 218. In this regard, the current generic buffer entry in the posted and current generic buffer table 206 may be updated to show SG=P6S and LG=P6L+P7L. The rcv_nxt entry in the TCP out-of-order table 204 may remain unchanged since the packet P2 has not yet been received by the NIC 120.

Figure 2H:
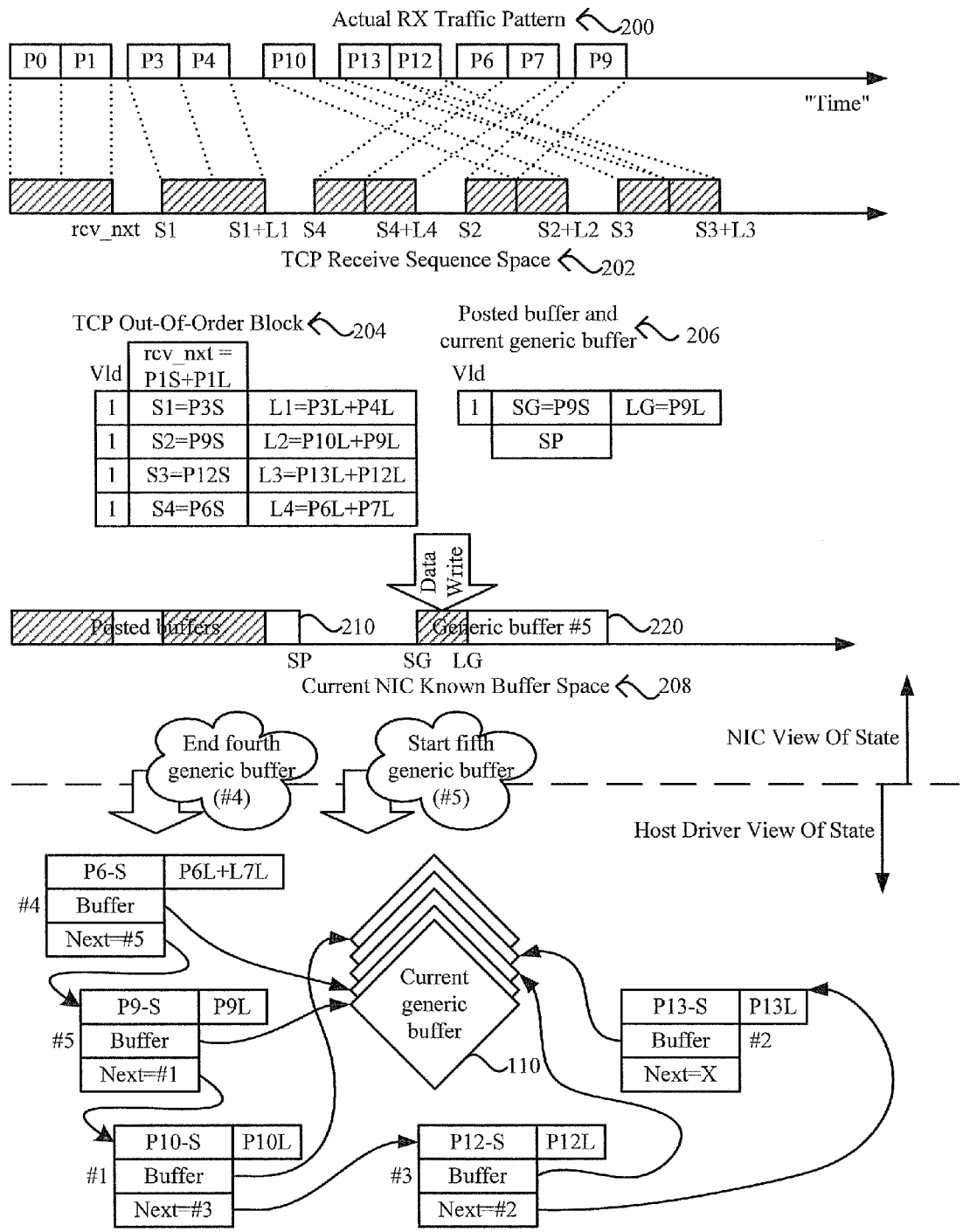
FIG. 2H is a diagram illustrating exemplary steps that may be utilized for handling out-of-order data when a packet P9 arrives out-of-order with respect to the order of transmission, in accordance with an embodiment of the invention.

FIG. 2H is a diagram illustrating exemplary steps that may be utilized for handling out-of-order data when a packet P9 arrives out-of-order with respect to the order of transmission, in accordance with an embodiment of the invention. Referring to FIG. 2H, the packet P9 may arrive at the NIC 120 before the arrival of the packets P2, P5, and P8, as shown in the actual receive RX traffic pattern 200. The packet P9 may correspond to a tenth packet in the TCP transmission sequence. In this case, there is a gap or time interval between the end of the packet P7 and the beginning of the packet P9 in the actual receive RX traffic pattern 200. The packet P9 may be placed to the left of the packet P10 in the second disjoint portion in the TCP transmission sequence as shown in the TCP receive sequence space 202, extending that contiguous area to the left. The second disjoint portion in the TCP transmission sequence may be indicated in the TCP out-of-order table 204 by updating the second entry S2=P9S and L2=P10L+P9L, where P9S is the sequence number of the packet P9 and P9L is the length of the packet P9.

The current generic buffer 110, which in this case, corresponds to the fourth generic buffer 218, may not be able to store the packet P9 because P9 is not in-order with respect to the current generic buffer. Since neither the first posted buffer 210 nor the current generic buffer 110 may have the appropriate storage space to store the packet P9, the NIC 120 may indicate to a driver in the host 100 that the fourth generic buffer 218 may need to be completed and a fifth generic buffer 220 has been allocated from the pool of generic buffers 114 and used to store the information from packet P9. In this regard, the current generic buffer 110 may be completed and placed in the linked list of generic buffers 112 as fourth generic buffer 218 and a new current generic buffer 110 may be posted that corresponds to the fifth generic buffer 220. In this regard, the current generic buffer entry in the posted and current generic buffer table 206 may be updated to show SG=P9S and LG=P9L. The linked list of generic buffers 112 may be updated to reflect the fact that the first generic buffer 212 may need to be placed after the current generic buffer 110 that contains information regarding the packet P9. The data in the packet P9 may be transferred to the current generic buffer 110. The rcv_nxt entry in the TCP out-of-order table 204 may remain unchanged since the packet P2 has not yet been received by the NIC 120. The link list in the host has been maintained in order based on the TCP sequence number of the first byte contained in each generic buffer.

Figure 2I:
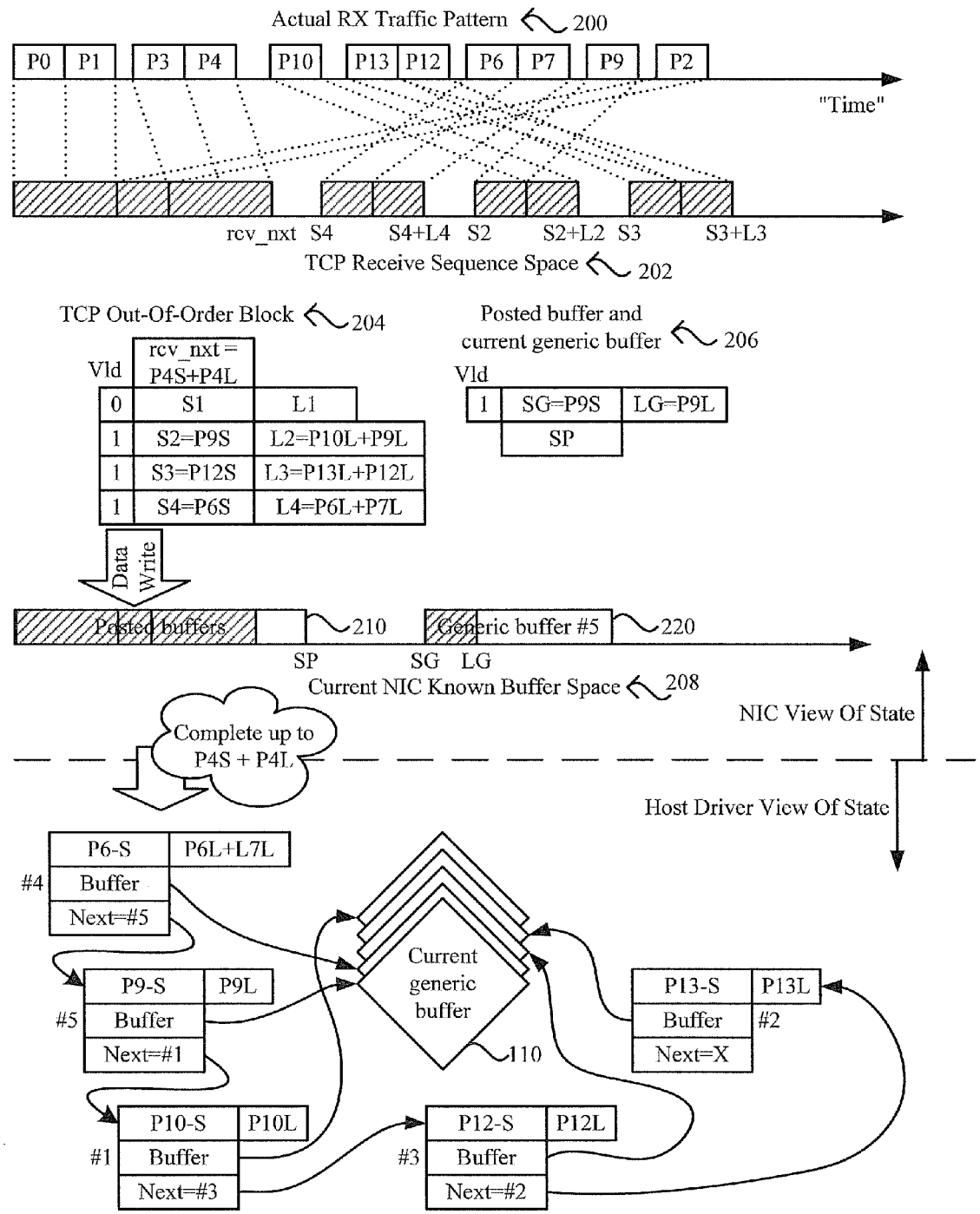
FIG. 2I is a diagram illustrating exemplary steps that may be utilized for handling out-of-order data when a packet P2 arrives out-of-order with respect to the order of transmission, in accordance with an embodiment of the invention.

FIG. 2I is a diagram illustrating exemplary steps that may be utilized for handling out-of-order data when a packet P2 arrives out-of-order with respect to the order of transmission, in accordance with an embodiment of the invention. Referring to FIG. 2I, the packet P2 may arrive at the NIC 120 as shown in the actual receive RX traffic pattern 200. The packet P2 may correspond to a third packet in the TCP transmission sequence. In this case, there is a gap or time interval between the end of the packet P9 and the beginning of the packet P2 in the actual receive RX traffic pattern 200. The packet P2 fills the gap between the rcv_nxt point and the first disjoint portion in the TCP transmission sequence as shown in the TCP receive sequence space 202. The first disjoint portion in the TCP transmission sequence may now be in-order as the packets P0, P1, P2, P3, and P4 have been received by the NIC 120. As a result, the TCP out-of-order table 204 may be updated to indicate that the first entry is no longer a valid entry since the first disjoint portion is no longer disjoint in the TCP space. In this regard, the valid flag for the first entry in the TCP out-of-order table 204 may be assigned a value of logic 0.

The first posted buffer 210 may have sufficient storage space to store the packet P2 between the end of the packet P1 and the start of the packet P3. The data in the packet P2 may be transferred to the first posted buffer 210. The rcv_nxt entry in the TCP out-of-order table 204 may be updated to rcv_nxt=P4S+P4L. The NIC 120 may indicate to a driver in the host 100 that the TCP sequence information is complete up to P4S+P4L. No updates or modifications may be necessary on the linked list of generic buffers 112.

Figure 2J:
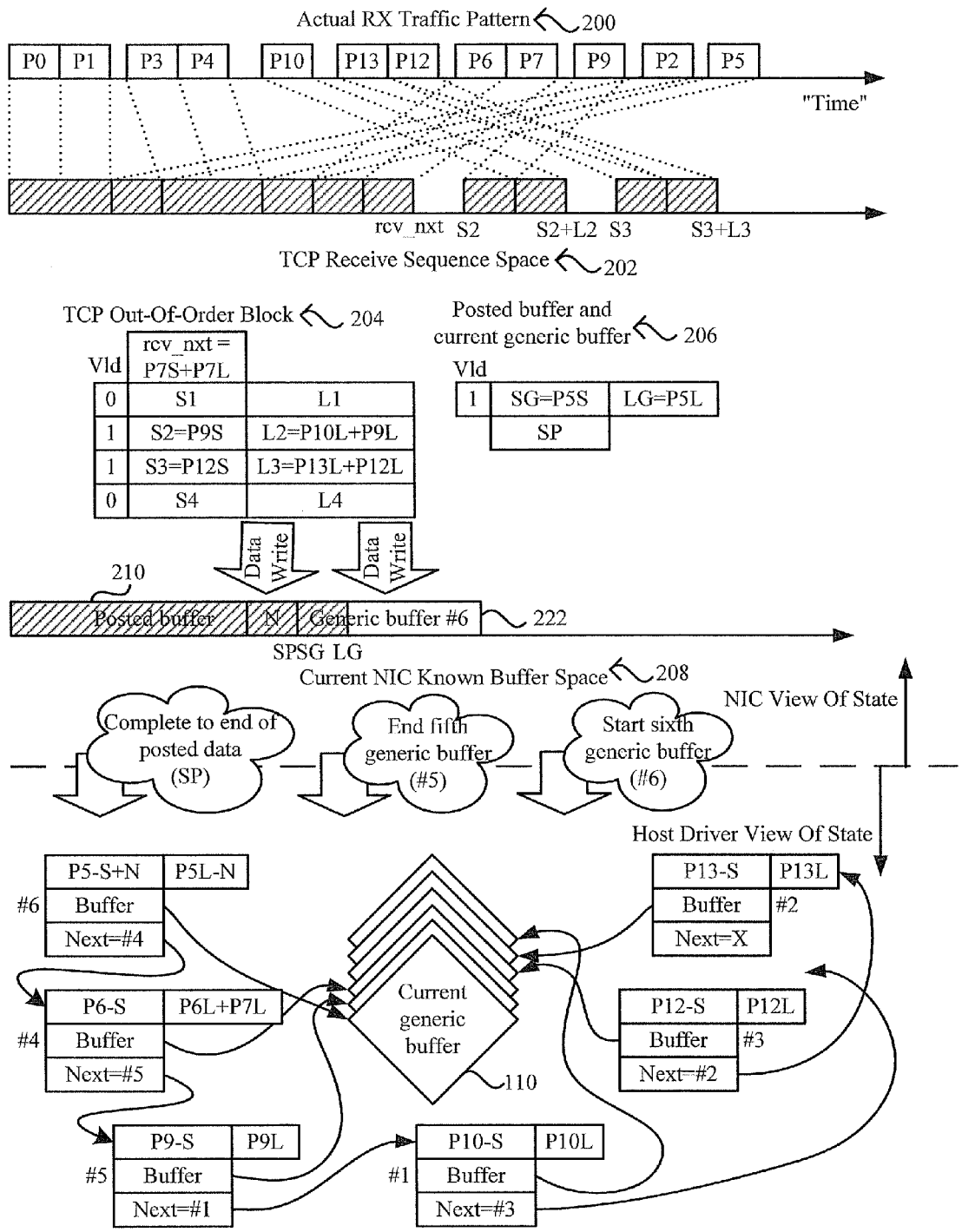
FIG. 2J is a diagram illustrating exemplary steps that may be utilized for handling out-of-order data when a packet P5 arrives out-of-order with respect to the order of transmission, in accordance with an embodiment of the invention.

FIG. 2J is a diagram illustrating exemplary steps that may be utilized for handling out-of-order data when a packet P5 arrives out-of-order with respect to the order of transmission, in accordance with an embodiment of the invention. Referring to FIG. 2J, the packet P5 may arrive at the NIC 120 as shown in the actual receive RX traffic pattern 200. The packet P5 may correspond to a sixth packet in the TCP transmission sequence. In this case, there is a gap or time interval between the end of the packet P2 and the beginning of the packet P5 in the actual receive RX traffic pattern 200. The packet P5 fills the gap between the rcv_nxt point and the fourth disjoint portion in the TCP transmission sequence as shown in the TCP receive sequence space 202. The fourth disjoint portion in the TCP transmission sequence may now be in-order as the packets P0, P1, P2, P3, P4, P4, P5, P6, and P7 have been received by the NIC 120. As a result, the TCP out-of-order table 204 may be updated to indicate that the fourth entry is no longer a valid entry since the fourth disjoint portion is no longer disjoint in the TCP space. In this regard, the valid flag for the fourth entry in the TOP out-of-order table 204 may be assigned a value of logic 0.

In this case, for example, the first posted buffer 210 may be able to store the first N bytes of the packet P5 and the current generic buffer 110, which in this case corresponds to the fifth generic buffer 220, may not be able to store the remaining bytes of the packet P5 because it in not in-order with respect to the data already in the current generic buffer. Since the current generic buffer 110 may not have sufficient storage space to store the remaining bytes of the packet P5, the NIC 120 may indicate to a driver in the host 100 that the fifth generic buffer 220 may need to be completed and a sixth generic buffer 222 may have been allocated from the pool of generic buffers and used to store the remaining information from packet P5. In this regard, the current generic buffer 110 may be completed and placed in the linked list of generic buffers 112 as the fifth generic buffer 220 and a new current generic buffer 110 may be posted that corresponds to the sixth generic buffer 222. In this regard, the current generic buffer entry in the posted and current generic buffer table 206 may be updated to show SG=P5S and LG=P5L. The linked list of generic buffers 112 may reflect the fact that the fourth generic buffer 218, which contains information regarding the packets P6 and P7, may follow the current generic buffer 110. The first N bytes of data in the packet P5 may be transferred to the first posted buffer 210 and the remaining bytes may be transferred to the current generic buffer 110. In this regard, the first posted buffer 210 may be completed in the host 110 since all the available storage has been utilized. The rcv_nxt entry in the TCP out-of-order table 204 may be updated to rcv_nxt=P7S+P7L.

Figure 2K:
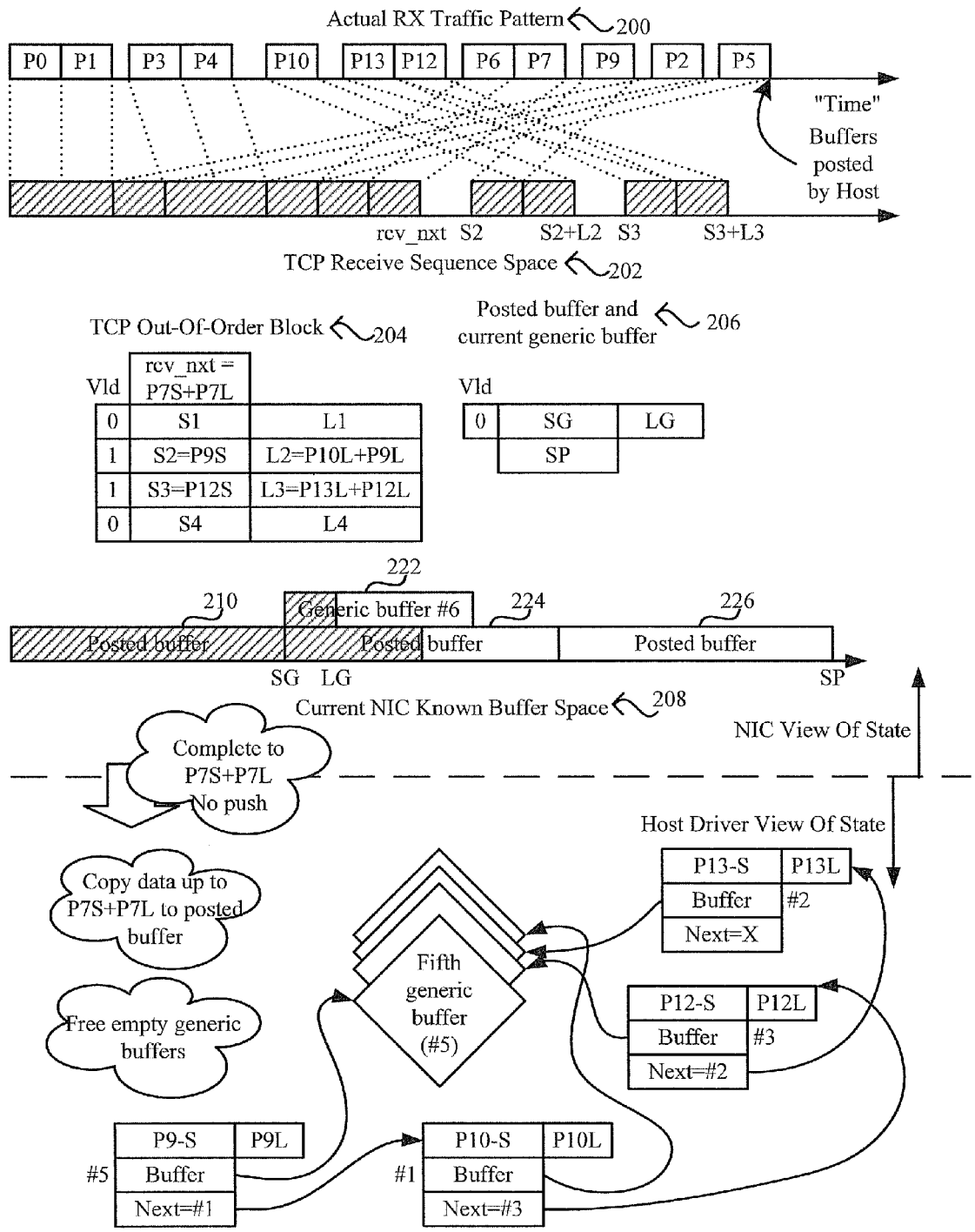
FIG. 2K is a diagram illustrating exemplary steps that may be utilized for handling out-of-order data when the host posts buffers after a packet P5 has arrived out-of-order with respect to the order of transmission, in accordance with an embodiment of the invention.

FIG. 2K is a diagram illustrating exemplary steps that may be utilized for handling out-of-order data when the host posts buffers after a packet P5 has arrived out-of-order with respect to the order of transmission, in accordance with an embodiment of the invention. Referring to FIG. 2K, the host 100 may post a second posted buffer 224 and a third posted buffer 226, which may comprise sufficient storage for all the packets that have arrived at the NIC 120 up until the arrival of the packet P5. The NIC 120 may, for example, move the posted buffer point SP in 206 to the new value, which is to the right of all the known data. In doing this, the NIC may notice that the current generic buffer is now completely to the left of the SP point. This means that the current generic buffer is may now be completed. The NIC may or may not inform the host 100 of this action. The current generic buffer entry in the posted and current generic buffer table 206 may be updated to SG and SL and the valid flag may be given a value of logic 0. The NIC 120 may generate instructions for completing the posted buffer up to rcv_nxt=P7S+P7L to the posted buffers. In this regard, a portion of the second posted buffer 224 may be utilized for storing data from the linked list of generic buffers 112. In response to the completion command, the host 100 may start tracing the linked list of generic buffers, copying data up to the TCP sequence number specified in the completion into the stream of posted buffers. In our example, the host 100 may find the sixth generic buffer 222 and the fourth generic buffer 218 to be less than the rcv_nxt point. The contents of these generic buffers are copied to the corresponding positions in the posted buffers. The two, now empty generic buffers may now be removed from the linked list of generic buffers 112 and returned to the list of free generic buffers 114 for later re-use by the NIC 120.

Figure 2L:
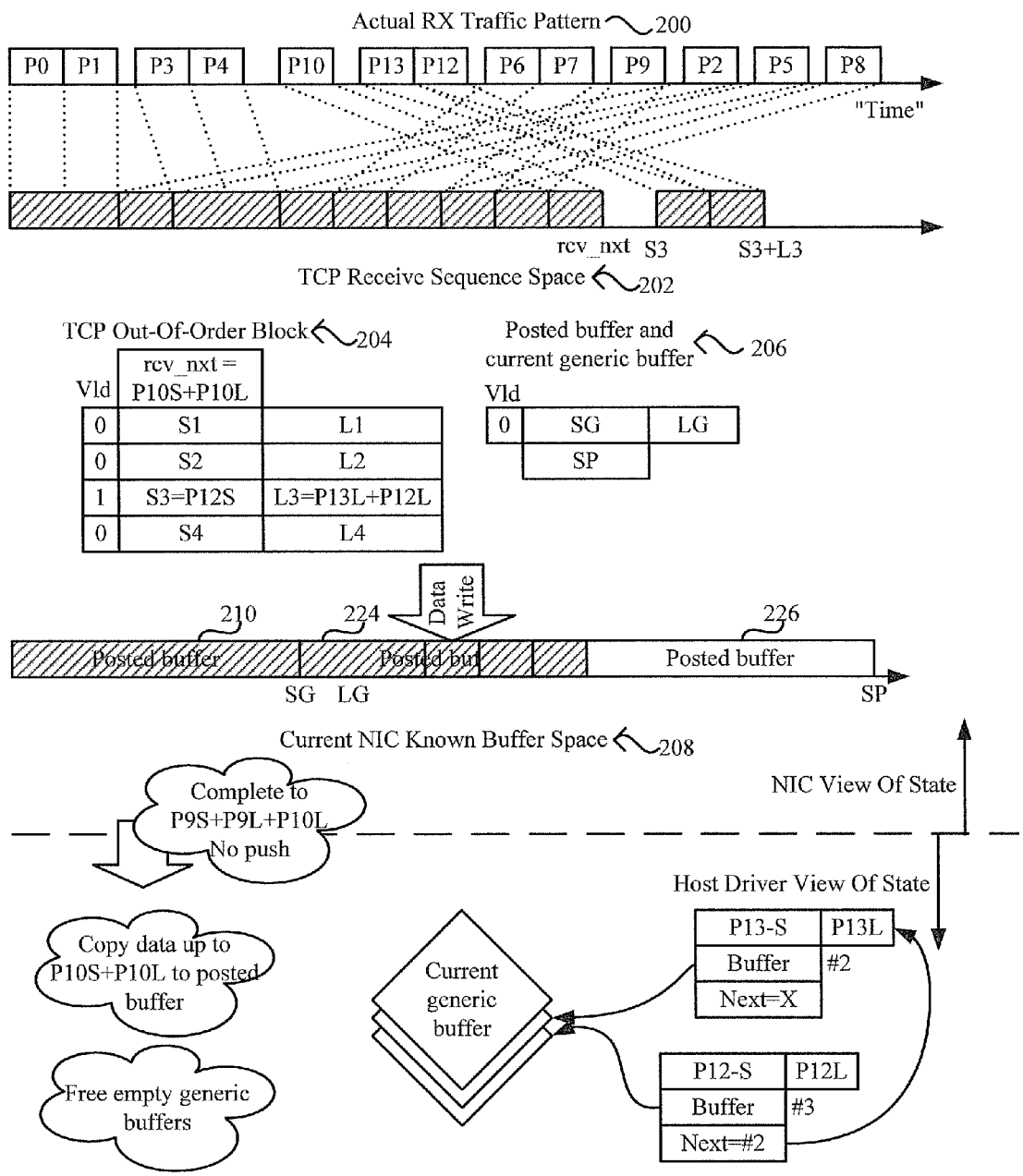
FIG. 2L is a diagram illustrating exemplary steps that may be utilized for handling out-of-order data when a packet P8 arrives out-of-order with respect to the order of transmission, in accordance with an embodiment of the invention.

FIG. 2L is a diagram illustrating exemplary steps that may be utilized for handling out-of-order data when a packet P8 arrives out-of-order with respect to the order of transmission, in accordance with an embodiment of the invention. Referring to FIG. 2L, the packet P8 may arrive at the NIC 120 as shown in the actual receive RX traffic pattern 200. The packet P8 may correspond to a ninth packet in the TCP transmission sequence. In this case, there is a gap or time interval between the end of the packet P5 and the beginning of the packet P8 in the actual receive RX traffic pattern 200. The packet P8 may fill the gap between the rcv_nxt point and the second disjoint portion in the TCP transmission sequence as shown in the TCP receive sequence space 202. The second disjoint portion in the TCP transmission sequence may now be in-order as the packets P0, P1, P2, P3, P4, P4, P5, P6, P7, P8, P9, and P10 have been received by the NIC 120. As a result, the TCP out-of-order table 204 may be updated to indicate that the second entry is no longer a valid entry since the second disjoint portion is no longer disjoint in the TCP space. In this regard, the valid flag for the second entry in the TCP out-of-order table 204 may be assigned a value of logic 0. The rcv_nxt entry in the TCP out-of-order table 204 may be updated to rcv_nxt=P10S+P10L.

The packet P8 may be written to the second posted buffer 224 to the right of the packet P7. The NIC 120 noticing that the rcv_nxt point has moved and is left of the SP point may generate an instruction to complete up to the new rcv_nxt point which is rcv_nxt=P10S+P10L. In this regard, a portion of the second posted buffer 224 and a portion of the third posted buffer 226 may be utilized. The host 100 interprets the completion by following the linked list of generic buffers up to the new rcv_nxt point. In this example, the fifth generic buffer 220 and the first generic buffer 212 may be copied to the posted buffers at the corresponding positions, removed from the linked list of generic buffers 112 and returned to the list of free generic buffers 114.

Figure 2M:
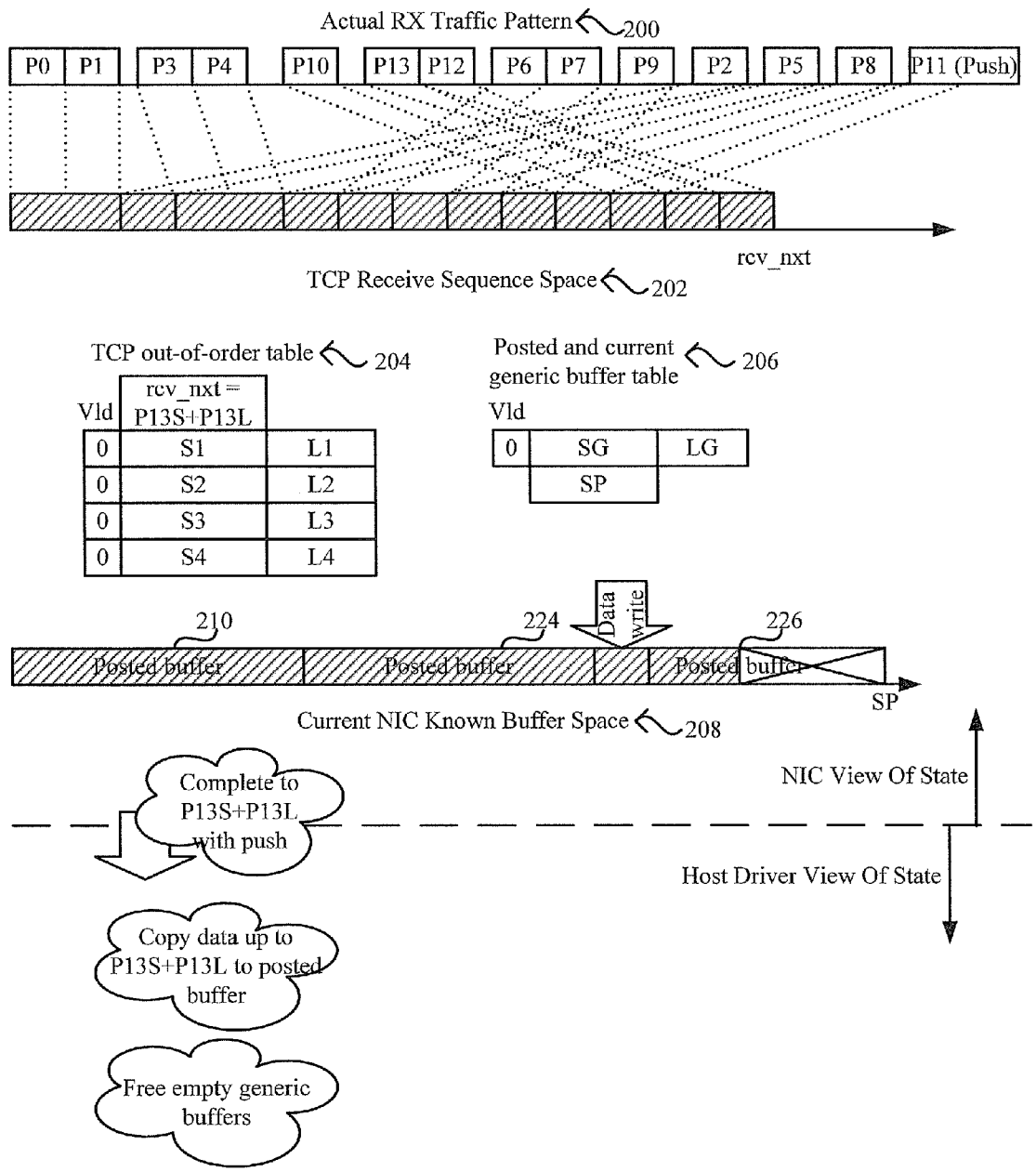
FIG. 2M is a diagram illustrating exemplary steps that may be utilized for handling out-of-order data when a packet P11 arrives out-of-order with respect to the order of transmission and a push operation is requested in accordance with an embodiment of the invention.

FIG. 2M is a diagram illustrating exemplary steps that may be utilized for handling out-of-order data when a packet P11 arrives out-of-order with respect to the order of transmission and a push operation is requested in accordance with an embodiment of the invention. Referring to FIG. 2M, the packet P11 may arrive at the NIC 120 as shown in the actual receive RX traffic pattern 200. The packet P11 may correspond to a twelfth packet in the TCP transmission sequence and may have, in this example, a PUSH bit set. In this case, there is a gap or time interval between the end of the packet P8 and the beginning of the packet P11 in the actual receive RX traffic pattern 200. The packet P11 fills the gap between the rcv_nxt point and the third disjoint portion in the TCP transmission sequence as shown in the TCP receive sequence space 202. The third disjoint portion in the TCP transmission sequence may now be in-order as the packets P0, P1, P2, P3, P4, P4, P5, P6, P7, P8, P9, P10, P11, P12, and P13 have been received by the NIC 120. As a result, the TCP out-of-order table 204 may be updated to indicate that the third entry is no longer a valid entry since the third disjoint portion is no longer disjoint in the TCP space. In this regard, the valid flag for the third entry in the TCP out-of-order table 204 may be assigned a value of logic 0. The rcv_nxt entry in the TCP out-of-order table 204 may be updated to rcv_nxt=P13S+P13L.

The packet P11 may be written to additional posted buffers to the right of the packet P10. The NIC 120 may generate instructions to complete up to the new rcv_nxt position and to push, which means to complete the current application posted buffer even though it is not filled yet. In processing the completion operation, the host 100 will trace the generic buffer list to get to the new rcv_nxt point. The host 100 may find the third generic buffer 216 and the second generic buffer 214 and may copy the data from each generic buffer to the application posted buffer. Once the generic buffers are empty the may be freed and may be removed from the linked list of generic buffers 112, and may be returned to the list of empty generic buffers 114. Moreover, since the PUSH bit was set in the packet P11, the NIC 120 may not utilize the remaining portion of the posted buffer. In this regard, after the driver completes copying the data up to P13S+P13L, the third posted buffer 226 may be completed back to the application that posted the buffer, indicating that it is not completely filled.

The illustrative example described in FIGS. 2A-2M provides a method for handling received out-of-order network data using generic buffers for non-posting TCP applications since the NIC 120 may have limited capacity to store out-of-order TCP data. TCP data received while posted buffers are available may be placed in the posted buffers without the need for copying. Packets that arrived out-of-order may be placed either to the right or the left of a disjoint portion of the TCP space in accordance to the correct order of transmission. In some instances, the disjoint portions of the TCP space may be dropped. This may occur, for example, when the NIC 120 reaches a limit of the number of disjoint portions that it may handle. In the illustrative example, the NIC 120 was capable of handling four disjoint portions of the TCP space. The number of disjoint portions of the TCP space that may be handled by the NIC 120 may vary based on system and/or design requirements. When a disjoint portion is dropped, one approach may be to drop any of the current disjoint portions and utilize the newly arrive data to form a new disjoint portion of the TCP space. Accordingly, the invention is not limited to four disjoint portions of the TCP space, but is capable of handling a plurality of disjoint portions of the TCP space.

While the description provided in FIGS. 2A-2M utilizes a driver to perform operations related to the current generic buffer 110, the linked list of generic buffers 112 and the posted buffers 108, all or a portion of these operations may be provided by either hardware and/or software in the NIC 120, the host 100, and/or an external device that may be coupled to either the NIC 120 or the host 100. The TCP reassembler 106 in FIG. 1 may be utilized for performing operations related to the current generic buffer 110, the linked list of generic buffers 112, the posted buffers 108, and the list of empty generic buffers 114. Moreover, the sorting and/or updating operation of the linked list of generic buffers 112 may also be performed when the contents of the generic buffers are to be copied to the posted buffers rather than when new generic buffers are introduced to the list as was shown in the example. Other variances are possible.

The invention is not limited in where the incoming packet boundaries fall in comparison to posted or generic buffers or previously received packets. All the packets in the example fit together with no over-lapping, but the TCP out-of-order table provides all the needed information to trim packets that contain data already placed or to drop packets that have already been placed in their entirety. Also, any packet that spans two different buffers of similar or dissimilar types can be conceptually split into two packets for the purposes of buffer placement.

Figure 3:
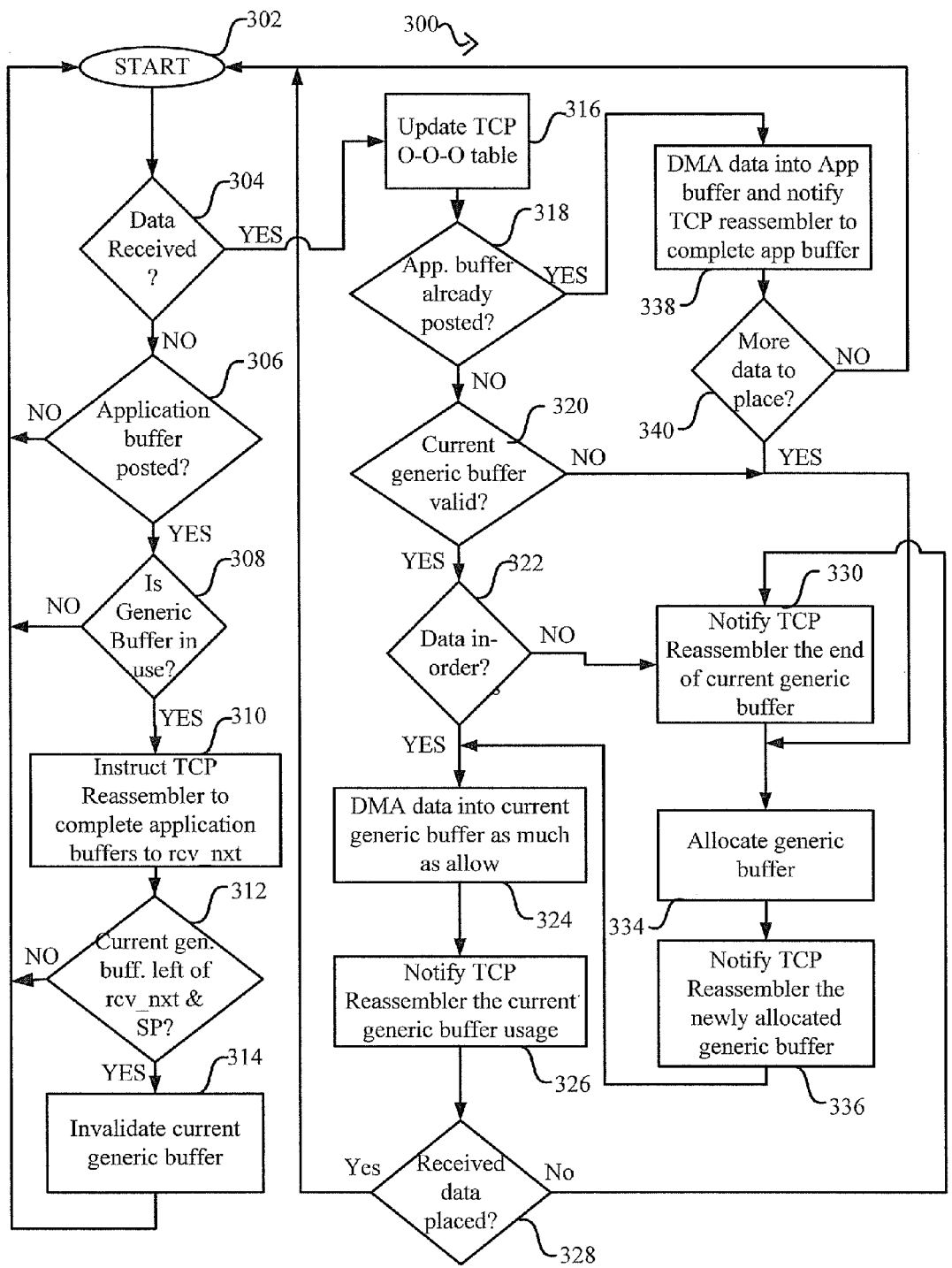
FIG. 3 is a flow chart illustrating exemplary steps that may be utilized for TCP data placement in accordance with an embodiment of the invention.

FIG. 3 is a flow chart illustrating exemplary steps that may be utilized for TCP data placement in accordance with an embodiment of the invention. Referring to FIG. 3, subsequent to start step 302, in step 304, the TCP data placement application 126 may be utilized to determine whether the NIC 120 has received incoming data. When incoming data is not received, then the TCP data placement application 126 may proceed to step 306 where it may determine whether a posted buffer 108 has been allocated by a TCP application in the host 100. In this regard, a posted buffer 108 in the host 100 may also be referred to as an application buffer, for example. When a posted buffer 108 has not been allocated or posted, then the TCP data placement application 126 may return to start step 302. When, on the other hand, a posted buffer 108 has been allocated, then the TCP data placement application 126 may proceed to step 308 where it may determine whether there is TCP data currently stored in generic buffers in the linked list of generic buffers 112.

When generic buffers are not in use, then the TCP data placement application 126 may return to start step 302. However, when generic buffers are in use in step 308, the TCP data placement application 126 may proceed to step 310 where it may instruct the TCP reassembler application 106, which may reside in the host 100, to complete the posted buffers up to the rcv_nxt point. Once step 310 has been completed, the TCP data placement application 126 may proceed to step 312 where it may determine whether the current posted buffer 110 is completely to the left of the rcv_nxt point and the end of the posted buffers. When the current generic buffer 110 is the left of rcv_nxt and SP, then the TCP data placement application 126 may proceed to step 314 where it may invalidate the current generic buffer. Once step 314 has been completed, the TCP data placement application 126 may return to start step 302. Returning to step 312, when the current generic buffer 110 is still to the right of rcv_nxt or SP, then the TCP data placement application 126 may return to start step 302.

In step 304 in FIG. 3, when the NIC 120 has received new incoming data the TCP data placement application 126 may proceed to step 316 where it may update the TCP out-of-order table 128 in FIG. 1. The update may occur in accordance with the description provided in FIGS. 2A-2M. In step 318, the TCP data placement application 126 may determine whether a posted buffer 108 has been allocated by a TCP application on the host 100 for the TCP sequence space covered by the packet. When a posted buffer has not been allocated, then the TCP data placement application 126 may proceed to step 320 where it may determine whether there is a valid current generic buffer 110. When there is no valid current generic buffer 110, the TCP data placement application 126 may proceed to step 334. When there is a valid current generic buffer 110, the TCP data placement application 126 may proceed to step 322 where it may determine whether the data was received in-order or out-of-order with respect to the data already placed in the current generic buffer. When the data received continues the current generic buffer, the TCP data placement application 126 may proceed to step 324 where it may DMA as much data as allowed to the current generic buffer 110. Following the completion of step 324, in step 326, the TCP data placement application 126 may notify and/or signal the TCP reassembler application 106 as to the new fuller status of the current generic buffer. In step 328, the TCP data placement application 126 may determine whether all received data has been placed into the current generic buffer 110 or if all of it did not fit. When the received data has been completely placed into the current generic buffer 110, the TCP data placement application 126 may return to start step 302.

In step 322, if the data received was out-of-order with respect to the current generic buffer, the TCP data placement application 126 may proceed to step 330 where it may notify and/or signal to the TCP reassembler application 106 to end of the current generic buffer 110. The TCP data placement application 126 may then proceed to step 334 where it may allocate a new current generic buffer 110 from the empty generic buffer list to store the received out-of-order data. Following step 334, in step 336, the TCP data placement application 126 may notify the TCP reassembler application 106 of the newly allocated current generic buffer 110. Once the newly allocated current generic buffer 110 is available, the TCP data placement application 126 may return to step 324. Returning to step 328, when the received data has not completely fit into the current generic buffer 110, the TCP data placement application 126 may proceed to step 330 where it may notify and/or signal the TCP reassembler application 106 to end the current generic buffer 110. Moreover, in step 320, when there is not a valid current generic buffer 110 to store the received data, the TCP data placement application 126 may again proceed to step 334 where it may allocate a new current generic buffer 110 to store the received data.

In step 318, when a posted buffer 108 has been allocated by a TCP application on the host 100 to receive incoming data and the posted buffer can hold at least a portion of the packet, the TCP data placement application 126 may proceed to step 338. In step 338, the TCP data placement application 126 may DMA the received data into the posted buffer 108 at a position that corresponds to the TCP sequence number of the incoming data and may notify the TCP reassembler application 106 to complete the posted buffer 108 if the application buffer is now full and the rcv_nxt point is to the right of the application buffer. Once step 338 has been completed, the TCP data placement application 126 may proceed to step 340 where it may determine whether all the received data has been placed. When more data needs placement, the TCP data placement application 126 may proceed directly to step 334 where it may allocate a new current generic buffer 110. Otherwise, the TCP data placement application 126 may return to start step 302. (several fixes to this figure. Need to fax you a copy. It didn't match the examples and there was an error also)

Figure 4:
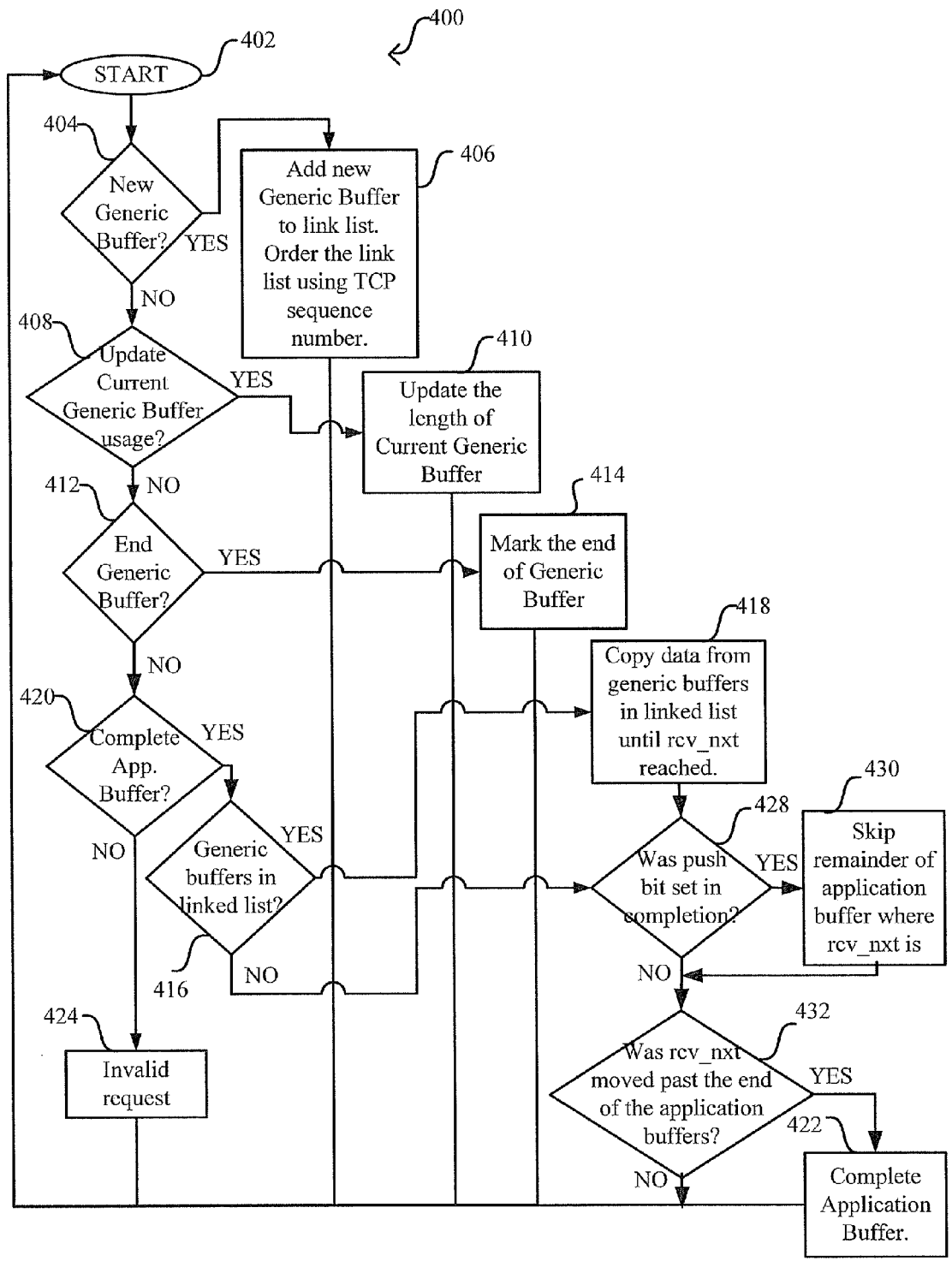
FIG. 4 is a flow chart illustrating exemplary steps the may be utilized by for TCP reassembling in accordance with an embodiment of the invention.

FIG. 4 is a flow chart illustrating exemplary steps the may be utilized for TCP reassembling 106 in accordance with an embodiment of the invention. Referring to FIG. 4, subsequent to start step 402, in step 404, the TCP reassembler application 106 may determine whether it has been notified that a new current generic buffer 110 has been allocated. When a new current generic buffer 110 has not been allocated, then the TCP reassembler application 106 may proceed to step 408. In step 408, the TCP reassembler application 106 may determine if any notification has been received that may require an update to the usage of the current generic buffer 110. When the usage does not need to be updated, then the TCP reassembler application 106 may proceed to step 412. In step 412, the TCP reassembler application 106 may determine whether it has been notified to end the current generic buffer 110. If a notification has not been received, then the TCP reassembler application 106 may proceed to step 420. In step 420, the TCP reassembler application 106 may determine if it has been instructed to complete the any application buffers. If the application buffer did not require completion, then the TCP reassembler application 106 may proceed to step 424 where it may label the request invalid. Once step 424 is complete, the TCP reassembler application 106 may return to start step 402.

In step 404, if notification was given that a new generic buffer 108 has been allocated, then the TCP reassembler application 106 may proceed to step 406 where it may add a new generic buffer 108 and where it may order the generic buffers 108 into a linked list by using TCP sequence number 210. Once step 406 is complete, the TCP reassembler application 106 may return to start step 402. In step 408, if notification has been received which may require an update to the usage of the current generic buffer 114, then the TCP reassembler application 106 may proceed to step 410 where it may update the length value 220 of the current generic buffer 114. Once step 410 is complete, the TCP reassembler application 106 may return to start step 402.

In step 412, if notification has been received to end the current generic buffer 108, then the TCP reassembler application 106 may proceed to step 414 where it may mark the end of the current generic buffer 108. Once step 414 is complete, the TCP reassembler application 106 may return to start step 402.

In step 420, if notification has been received to complete the application buffer up to a new rcv_nxt TCP sequence number point, then the TCP reassembler application 106 may proceed to step 416. In step 416, the TCP reassembler application 106 may check to see if there is a valid linked list of generic buffers. If there is not list of generic buffers, then the TCP reassembly application may proceed to step 428. In step 428, the TCP reassembler application may check if the push bit was set in the completion indication. If the push bit was not set, then the TCP reassembly application may proceed to step 432. In step 432, the TCP reassembly application 106 may check to see if the rcv_nxt point has moved past the end of any application buffers. If the rcv_nxt point has not moved past the end of any application buffers, then the TCP reassembly application 106 may return to 402.

Returning to step 416, If there is a linked list of generic buffers, then the TCP reassembler application may proceed to step 418 where it may copy the contents of the generic buffers in the link list to the corresponding position in the application buffer. As generic buffers are completely copied, they may be removed from the linked list of generic buffers and returned to the list of empty generic buffers. This copy process is repeated until the end of rcv_nxt point is reached. Once the rcv_nxt point is reached, the TCP reassembler application may proceed to step 428.

Returning to step 428, if the push bit was set in the completion indication, the TCP reassembler application 106 may skip what ever portion of the current application buffer remains and align the current rcv_nxt position with the start of the next application buffer. This will ensure that the test in step 432 will be true. Once the rcv_nxt position has been adjusted in the steam of application buffers, the TCP reassembler application may move to step 432. In step 432, the TCP reassembler application 106 may verify if the rcv_nxt point has moved past the end one or more application buffers since the start of processing for the completion in step 420. If the rcv_nxt point has not moved past any application buffers, then the TCP reassembler application may return to step 402.

In step 432, if the rcv_nxt point has moved past the end of one or more applications buffers, then the TCP reassembler application may move to step 422. In step 422, the one or more application buffers are returned to the application. This operation may indicate that a buffer was not completely filled if a push operation occurred. When the buffer completion is done, the TCP reassembler application may return to step 402. Notwithstanding, the exemplary steps illustrated in FIG.

3 and FIG. 4, it should be recognized that other steps may be added, substituted or made optional without departing from the scope of the invention.

The primary benefit of this invention is that generic buffers may be allocated in host memory and efficiently used. The invention moves a huge amount of storage required for a TOE implementation (generic buffers) to the in-expensive host memory, allowing single chip implementation of TOE utilizing all on-chip buffer memory. This is because received data may be placed in application buffer or generic buffer as the data is received or soon after it is received. There is no need to wait for additional received in-order reception before data is placed in host memory. The invention allows same benefit to be achieved in the presence of out-of-order received data, including cases where the contiguous island extends in-order (right) or in reverse-order (left). There is no need to drop data unless the design limit of the number of contiguous islands is reached. This number of "islands" limit is a natural limitation in the NIC because every incoming packet must be compared to each island, thus requiring additional processing power as well as memory for the support of more islands. The invention makes optimal use of host posted application buffers at all times by always placing data in application buffer if it posted before receive data is processed, regardless of out-of-order conditions. This minimized the generic buffer to application buffer copy operation as much as possible.

Another benefit of the invention is that it allows the storage on the NIC associated with a TCP connection to be controlled to a fixed size structure for a given number of discontinuous receive data areas. The NIC stores only the out-of-order information and information about the "current" generic buffer. The NIC has not need to remember anything about the many generic buffers that may be needed to store the data as it is received. This larger generic buffer linked list is moved to the host for storage where the memory is relatively inexpensive. This is crucial for implementation of a TOE with all on-chip control data as well as buffer data. A true single chip TOE solution brings the cost of TOE within the reach of very high volume markets.

Another benefit is that "bandwidth peaks" on the NIC and on the path from the NIC to host memory are removed from the receive process. In a traditional store-and-forward TOE where the TCP re-assembly buffers are on the NIC, the path from the re-assembly buffers is not used while the NIC is receive out-of-order data. When the in-order data finally arrives, the path from the re-assembly buffers on the NIC to host memory must accommodate not only the now in-order data, but also any new in-order data being received by the NIC. Unless the design counts on relatively infrequent out-of-order, this will create bandwidth peaks of twice the nominally required bandwidth along this path. The invention removes these peaks by always placing the packet in an application buffer or a generic buffer, regardless of order in which the data is received, thus producing a constant, predictable flow of data from the NIC to the host.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for receiving data from a communication network, the method comprising:
    assigning a plurality of generic buffers in a host system to store Transmission Control Protocol (TCP) data received from a communication network when said host system has not posted an application buffer, where said received TCP data is in-order data or out-of-order data;
    maintaining a data structure organizing said assigned plurality of generic buffers based on a transmission sequence of said received TCP data; and
    transferring said received TCP data stored in said assigned plurality of generic buffers to at least one application buffer when said at least one application buffer is posted by said host system.

2. The method according to claim 1, comprising transferring at least a portion of said received TPC data to at least a portion of said assigned plurality of generic buffers via direct memory access (DMA).

3. The method according to claim 1, comprising tracking a sequence number and a length of disjoint portions of a data sequence space associated with at least a portion of said received TCP data.

4. The method according to claim 1, comprising tracking an extent of said at least one posted application buffer.

5. The method according to claim 1, comprising assigning a current generic buffer to store at least a portion of said received TCP data.

6. The method according to claim 5, comprising tracking a sequence number and a length of said assigned current generic buffer.

7. The method according to claim 5, comprising separating processing of said received TCP data into out-of-order tracking and posted application buffer processing in a remote system and processing of out-of-order segments sorting and buffer completion processing in said host system.

8. The method according to claim 7, wherein said remote system is a network interface card (NIC).

9. The method according to claim 1, comprising allocating a new generic buffer and incorporating said allocated new generic buffer into said data structure organizing said assigned plurality of generic buffers, when a new generic buffer is needed to store at least a portion of said received TCP data.

10. The method according to claim 1, comprising allocating a new generic buffer and incorporating said allocated new generic buffer into said data structure organizing said assigned plurality of generic buffers, when said received TCP data is discontinuous or said received TCP data exceeds the size of a current generic buffer.

11. The method according to claim 1, comprising maintaining said data structure organizing said assigned plurality of generic buffers when at least a portion of said received TCP data in said assigned plurality of generic buffers is transferred to said at least one posted application buffer.

12. The method according to claim 1, comprising storing in a first memory information associated with out-of-order tracking and with status of a single generic buffer.

13. The method according to claim 12, wherein said first memory is in a network interface card (NIC).

14. The method according to claim 1, comprising storing in a second memory information associated with a data structure organizing generic buffers for in-order data and with said at least one posted application buffer.

15. The method according to claim 14, wherein said second memory is in said host system.

16. A non-transitory machine-readable storage having stored thereon, a computer program having at least one code section for receiving data from a communication network, the at least one code section being executable by a machine for causing the machine to perform steps comprising:

assigning a plurality of generic buffers in a host system to store Transmission Control Protocol (TCP) data received from a communication network when said host system has not posted an application buffer, where said received TCP data is in-order data or out-of-order data;

maintaining a data structure organizing said assigned plurality of generic buffers based on a transmission sequence of said received TCP data; and transferring said received TCP data stored in said assigned plurality of generic buffers to at least one application buffer when said at least one application buffer is posted by said host system.

17. The non-transitory machine-readable storage according to claim 16, comprising code for transferring at least a portion of said received TCP data to at least a portion of said assigned plurality of generic buffers via direct memory access (DMA).

18. The non-transitory machine-readable storage according to claim 16, comprising code for tracking a sequence number and a length of disjoint portions of a data sequence space associated with at least a portion of said received TCP data.

19. The non-transitory machine-readable storage according to claim 16, comprising code for tracking an extent of said at least one posted application buffer.

20. The non-transitory machine-readable storage according to claim 16, comprising code for assigning a current generic buffer to store at least a portion of said received TCP data.

21. The non-transitory machine-readable storage according to claim 20, comprising code for tracking a sequence number and a length of said assigned current generic buffer.

22. The non-transitory machine-readable storage according to claim 20, comprising code for separating processing of said received TCP data into out-of-order tracking and posted application buffer processing in a remote system and processing of out-of-order segments sorting and buffer completion processing in said host system.

23. The non-transitory machine-readable storage according to claim 22, wherein said remote system is a network interface card (NIC).

24. The non-transitory machine-readable storage according to claim 16, comprising code for allocating a new generic buffer and incorporating said allocated new generic buffer into said data structure organizing said assigned plurality of generic buffers, when a new generic buffer is needed to store at least a portion of said received TCP data.

25. The non-transitory machine-readable storage according to claim 16, comprising code for allocating a new generic buffer and incorporating said allocated new generic buffer into said data structure organizing said assigned plurality of generic buffers, when said received TCP data is discontinuous or said received TCP data exceeds the size of a current generic buffer.

26. The non-transitory machine-readable storage according to claim 16, comprising code for maintaining said data structure organizing said assigned plurality of generic buffers when at least a portion of said received TCP data in said assigned plurality of generic buffers is transferred to said at least one posted application buffer.

27. The non-transitory machine-readable storage according to claim 16, comprising code for storing in a first memory information associated with out-of-order tracking and with status of a single generic buffer.

28. The non-transitory machine-readable storage according to claim 27, wherein said first memory is in a network interface card (NIC).

29. The non-transitory machine-readable storage according to claim 16, comprising code for storing in a second memory information associated with a data structure organizing generic buffers for in-order data and with said at least one posted application buffer.

30. The non-transitory machine-readable storage according to claim 29, wherein said second memory is in said host system.

31. A system for receiving data from a communication network, the system comprising:

circuitry operable to assign a plurality of generic buffers in a host system to store Transmission Control Protocol (TCP) data received from a communication network when said host system has not posted an application buffer, where said received TCP data is in-order data or out-of-order data;

circuitry operable to maintain a data structure organizing said assigned plurality of generic buffers based on a transmission sequence of said received TCP data; and circuitry operable to transfer said received TCP data in said assigned plurality of generic buffers to at least one application buffer when said at least one application buffer is posted by said host system.

32. The system according to claim 31, comprising circuitry operable to transfer at least a portion of said received TCP data to at least a portion of said assigned plurality of generic buffers via direct memory access (DMA).

33. The system according to claim 31, comprising circuitry operable to track a sequence number and a length of disjoint portions of a data sequence space associated with at least a portion of said received TCP data.

34. The system according to claim 31, comprising circuitry operable to track an extent of said at least one posted application buffer.

35. The system according to claim 31, comprising circuitry operable to assign a current generic buffer to store at least a portion of said received TCP data.

36. The system according to claim 35, comprising circuitry operable to track a sequence number and a length of said assigned current generic buffer.

37. The system according to claim 35, comprising remote system circuitry operable to perform out-of-order tracking and posted application buffer processing, and host system circuitry to perform processing of out-of-order segments sorting and buffer completion processing.

38. The system according to claim 37, where said remote system is a network interface card (NIC).

39. The system according to claim 31, comprising circuitry operable to allocate a new generic buffer and incorporate said allocated new generic buffer into said data structure organizing said assigned plurality of generic buffers, when a new generic buffer is needed to store at least a portion of said received TCP data.

40. The system according to claim 31, comprising circuitry operable to allocate a new generic buffer and incorporate said allocated new generic buffer into said data structure organizing said assigned plurality of generic buffers, when said received TCP data is discontinuous or said received TCP data exceeds the size of a current generic buffer.

41. The system according to claim 31, comprising circuitry operable to maintain said data structure organizing said assigned plurality of generic buffers when at least a portion of said received TCP data in said assigned plurality of generic buffers is transferred to said at least one posted application buffer.

42. The system according to claim 31, comprising circuitry operable to store in a first memory information associated with out-of-order tracking and with status of a single generic buffer.

43. The system according to claim 42, wherein said first memory is in a network interface card (NIC).

44. The system according to claim 31, comprising circuitry operable to store in a second memory information associated with a data structure organizing generic buffers for in-order data and with said at least one posted application buffer.

45. The system according to claim 44, wherein said second memory is in said host system.

\* \* \* \* \*